(12) United States Patent
Hansson et al.

(10) Patent No.: US 11,413,119 B2
(45) Date of Patent: Aug. 16, 2022

(54) FIXTURE AND A FIXTURE SET

(71) Applicant: DENTSPLY SIRONA INC., York, PA (US)

(72) Inventors: Stig Hansson, Askim (SE); Anders Halldin, Mölndal (SE)

(73) Assignee: DENTSPLY SIRONA INC., York, PA (US)

(*) Notice: Subject to any disclaimer, the term of this patent is extended or adjusted under 35 U.S.C. 154(b) by 242 days.

(21) Appl. No.: 16/567,550

(22) Filed: Sep. 11, 2019

(65) Prior Publication Data
US 2020/0000558 A1 Jan. 2, 2020

Related U.S. Application Data

(63) Continuation of application No. 13/445,084, filed on Apr. 12, 2012, now abandoned.

(60) Provisional application No. 61/475,327, filed on Apr. 14, 2011, provisional application No. 61/475,324, filed on Apr. 14, 2011, provisional application No. 61/475,329, filed on Apr. 14, 2011, provisional application No. 61/475,331, filed on Apr. 14, 2011.

(30) Foreign Application Priority Data

| Apr. 14, 2011 | (EP) | 1162464 |
| Apr. 14, 2011 | (EP) | 1162468 |
| Apr. 14, 2011 | (EP) | 1162478 |
| Apr. 14, 2011 | (EP) | 1162481 |

(51) Int. Cl.
*A61C 8/00* (2006.01)

(52) U.S. Cl.
CPC .......... *A61C 8/0018* (2013.01); *A61C 8/0022* (2013.01)

(58) Field of Classification Search
CPC ..... A61C 8/0018; A61C 8/022; A61C 8/0028; A61C 8/0025
USPC .................................................. 433/172–176
See application file for complete search history.

(56) References Cited

U.S. PATENT DOCUMENTS

| 6,402,515 B1 * | 6/2002 | Palti ..................... A61C 8/0022 |
| | | 433/174 |
| 2004/0121289 A1 | 6/2004 | Miller | |

FOREIGN PATENT DOCUMENTS

WO WO-2011038915 A1 * 4/2011 ............. A61C 8/005

* cited by examiner

*Primary Examiner* — Nicholas D Lucchesi
*Assistant Examiner* — Mirayda A Aponte
(74) *Attorney, Agent, or Firm* — Dentsply Sirona Inc.

(57) ABSTRACT

A fixture for insertion into a bore hole arranged in bone tissue is provided. The fixture has a threaded leading portion provided with at least one cutting edge for creating a female thread in the bone tissue, and a threaded trailing portion following the leading portion in the created female thread. Compared to the geometry of a thread peak of said cutting edge of the leading portion, a thread peak of the trailing portion is displaced or overdimensioned in at least one of the coronal and apical directions of the fixture so that a strain is provided to the bone when said displaced or overdimensioned thread peak engages with the created female thread. A fixture set for creating a strain is also provided, the set includes a fixture and a separate thread maker.

11 Claims, 11 Drawing Sheets

FIXTURE AND A FIXTURE SET

TECHNICAL FIELD

The present invention relates to a fixture, such as a dental fixture, for insertion into a bore hole arranged in bone tissue, the fixture comprising a threaded outer surface for engagement with the bone tissue. The invention also relates to a fixture set comprising a fixture and a thread maker.

BACKGROUND OF THE INVENTION

A frequent way today to restore a damaged limb, such as lost tooth, is to install a fixture in the adjacent bone tissue and replace the damaged parts. In this respect, for a successful result, the fixture should become fully stable and correctly joined to the bone. The term osseointegration is used for this joining effect, the basic meaning of this term being the bone tissue growth into the fixture surface. The two major contributors to this joint are a mechanical joint and an organic joint. The former being generally influenced by the macro geometry of the bore into which the fixture is installed, and by the macro geometry of the fixture, and is a direct effect of how well these two work together. The latter one being a continuously evolving and developing effect, particularly the time immediately after installation, and being generally influenced by how well the micro surface structure of the fixture interacts with the bone tissue.

Due to ingrowth there will be an interlocking effect between the bone and the fixture. Also, the mechanical joint is developed over time since the bone tissue, under ideal conditions, may grow into surface cavities of the fixture, and grow into voids left between the fixture and the bore after installation.

During installation of a fixture into the bone tissue, the bone is subjected to both stress and strain. The relationship between stress and strain is substantially linear up to a yield point (yield strain). Up to the yield point the bone is deformed elastically. However, beyond the yield point the bone will deform plastically. In order to provide for good healing conditions and stability of the fixture in the bone, care is taken to maintain the elasticity of the bone tissue and to avoid exceeding the yield point.

There is a continuous endeavour in the industry to further increase the stability of fixtures implanted in bone tissue and to improve the basic conditions during the healing phase after fixture installation. One example is the provision of the fixture surface with different types of structures, such as micro-roughened or blasted structures for increasing the contact surface between the fixture and the bone.

Nevertheless, there is still room for further development of fixtures as regards their stability in bone tissue.

SUMMARY OF THE INVENTION

An object of the present invention is to provide a fixture, in particular a dental fixture, which has a high bone-anchoring stability/strength during the healing phase of the fixture. This and other objects, which will become apparent in the following, are accomplished by means of a fixture defined in the accompanying claims.

The present invention is based on the insight that exceeding the yield point of the bone during and after implantation may actually be beneficial to the anchoring strength/stability of the fixture during the healing phase of the bone. In particular, the inventors have found that strains in the axial direction which exceed the ultimate strain of the bone, i.e. when the bone cracks, may also be beneficial to trigger the biological response during the healing phase after fixture installation. Although cracks may be formed near the fixture, there will be present stabilizing surrounding bone tissue.

In this application, when strain is discussed, or when different values of strain are discussed, the discussion may relate to tensile strain and/or compressive strain. AU strain-related numbers are presented in absolute values.

The insertion of a fixture with a certain torque means that static strains will be induced in the surrounding bone. The magnitude of these static strains do not only depend on the insertion torque but also depend on the fixture design, the shape of the bone preparation, the bone anatomy, the bone quality and possibly also on the fixture surface topography. Rather than to elaborate on these different parameters, some of which are difficult to estimate, the inventors have ingeniously realized that it is possible to achieve an adequately controlled static strain by fixture design.

When a self-tapping fixture having cutting edges or a separate tapper (pretapping before fixture installation) is screwed into a bore hole in the bone tissue a female bone thread (which is complementary to the male fixture or tapper thread) is created in the bone tissue surrounding a bore hole. In cross-section, the female bone thread will have thread peaks which are axially separated by troughs. Such a thread peak in the bone may also be referred to as a bone plug. The bone plugs of this female thread will have a certain dimension. By providing a fixture with a specific portion having thread peaks that are axially overdimensioned relative to the receiving troughs of the female thread or partly displaced axially relative to the receiving throughs of the female thread, an axial pressure will be applied to the bone plug when said threaded portion is rotated into the bone via said female bone threads. The axially enlarged or displaced thread peaks on the fixture will thus lead to a condensation of the bone tissue.

This means that by controlling the difference in axial extension between the thread peaks of said threaded fixture portion and the female bone thread with which the threads of said portion will mate, a controlled static strain may be achieved.

For instance, said controlled strain may be achieved by having a threaded leading portion of the fixture with a first width of the thread peaks corresponding to the width of the troughs of the created female bone threads, and a threaded trailing portion of the fixture with a second width of the thread peaks which has a larger extension in the axial direction than said first width.

Thus, the inventive idea may in general terms be described as providing a bore hole in the bone tissue, then providing a female thread in the bone tissue surrounding the bore hole, and then applying a static axial pressure to the bone so that a strain is achieved in the bone.

According to at least a first aspect of the invention, a fixture for insertion into a bore hole arranged in bone tissue is provided. The fixture has a geometrical central axis and comprises a leading portion provided with at least one cutting edge for creating a female thread in the bone tissue, and a trailing portion following the leading portion in the created female thread, wherein both of said portions comprise a respective outer surface being threaded for engagement with bone tissue, wherein thread tops and thread bottoms are provided alternatingly in the axial direction of the fixture, each thread top forming part of a thread peak arranged between two consecutive thread bottoms, wherein a largest thread peak of said cutting edge of the leading portion forms part of a thread having a lead, wherein compared with an imaginary continuation into the trailing portion of said largest thread peak following said lead:

- a first area of a thread peak of the trailing portion is axially aligned with said imaginary continuation, and
- a second area of said thread peak of the trailing portion is axially displaced compared with said imaginary continuation, thereby providing a strain to the bone when said thread peak of the trailing portion engages with the created female thread, the comparison of the thread peaks being made at a same first distance from a respective thread bottom measured perpendicularly to said central axis, and/or at a same second distance from a respective thread top measured perpendicularly to said central axis.

Thus, when the cutting edge or edges of the leading portion make a female bone thread in the bone there will be substantially no strain, since bone is cut away rather than pressed away. When the threaded trailing portion enters the female thread in the bone, due to the increased coronal and/or apical extension (relative to the female bone thread) of one or more thread peaks of the trailing portion, the thread peaks will press the bone in the axial direction creating a static strain in the bone tissue.

The largest thread peak of the cutting edge of the leading portion will form the final geometry of the female bone thread in which the trailing portion will follow. The thread peak forms part of a thread having a lead. This lead defines an endless geometrical spiral path around the fixture axis. If the contour/geometry of said largest thread peak would be guided along the geometrical spiral path into the trailing portion it would not completely accommodate the contour/geometry of the strain-providing thread peak of the trailing portion. Instead, the contour/geometry of said thread peak in the trailing portion will have a first area which would be accommodated within the guided contour/geometry of said largest thread peak of the cutting edge and a second area which would be located outside the guided contour/geometry of said largest thread peak of the cutting edge.

It should be understood that when referring to the "largest thread peak of the cutting edge" it is a part of the cutting edge that forms the specific female bone thread in which the strain-providing thread peak of the trailing portion will follow. Thus, if a fixture would have two parallel thread spirals, but only one of the spirals have a strain-providing thread peak in the trailing portion, "the largest thread peak of the cutting edge" is located on that spiral, even if the cutting edge has large thread peaks on the other spiral (which will not have any strain-providing thread peaks in the trailing portion).

It should be understood that the size of the strain-providing thread peak in the trailing portion may be larger, smaller or equal to the largest thread peak of the cutting edge in the leading portion, as long as it has said second area which is displaced as described above.

Although said thread peak of the trailing portion will provide an axial pressure on the bone, the resulting strain is not necessarily just an axial strain, but may also result in a certain amount of radial strain, e.g. depending on the geometry of the thread peaks.

The leading portion comprises one or more cutting edges. However, the trailing portion is suitably non-cutting, i.e. the trailing portion is void of cutting edges, or at least the thread peak or thread peaks providing said strain are non-cutting. It should be noted that when discussing the largest thread peak of the cutting edge, the cutting edge may include several thread peaks which are the "largest", normally these would be located at a coronal section of the cutting edge.

According to at least one example embodiment, said largest thread peak of said cutting edge of the leading portion forms part of a thread having a lead defining a first helical path in the leading portion, wherein said thread peak of the trailing portion forms part of a thread having a lead defining a second helical path which is partly axially displaced relative to an imaginary extension into the trailing portion of the first helical path. The first helical path will correspond to the path of the created female bone thread. Thus, by having said first and second helical paths displaced relative to each other, said second area of the strain-providing thread peak of the trailing portion will press the created female bone thread. It should be noted that the displacement may be in either the coronal direction or in the apical direction. For instance, at an axial location between the cutting edge of the leading portion and the strain-providing thread peak in the trailing portion a thread may locally (for instance along one thread revolution) be made narrower, resulting in that the coronally following thread will be located slightly more apically than if the thread would not have been made narrower locally. In other words, there is a smaller pitch locally. If instead a thread bottom is widened locally (for instance along one thread revolution), it would result in that the coronally following thread will be located slightly more coronally than otherwise. In other words, there is a larger pitch locally.

According to at least one example embodiment, compared to the geometry of the largest thread peak of said cutting edge of the leading portion, a thread peak of the trailing portion is overdimensioned in at least one of the coronal and apical directions of the fixture so that a strain is provided to the bone when said overdimensioned thread peak engages with the created female thread, the comparison being made at a same first distance from a respective thread bottom measured perpendicularly to said central axis, and/or at a same second distance from a respective thread top measured perpendicularly to said central axis.

If the overdimensioning of the thread peak in the trailing portion is present in both the coronal and the apical direction, then the axial extension (where said comparison is made) of that thread peak is larger than the axial extension of the largest thread peak of the cutting edge of the leading portion.

However, there are other conceivable dimensionings. For instance, the thread peak of the trailing portion may have almost the same geometry as the thread peak of the cutting edge of the leading portion but with the following two differences: 1) the coronal flank of the thread peak in the trailing portion is made concave or is provided with a notch or groove for bone in-growth, and 2) the apical flank of the thread peak in the trailing portion is made convex or provided with a bulge. In this case the thread peak in the trailing portion will be overdimensioned in the apical direction, and will create a pressure on the bone in the apical direction, resulting in said strain, but at the same time the trailing portion is underdimensioned in the coronal direction due to the groove or concavity. Therefore, the axial extension will not necessarily be larger for the thread peak in the trailing portion compared to the thread peak in the leading portion. Of course, the corresponding principle would also be possible for a notch on the apical flank and a bulge on the coronal flank.

Although the axial extension of the thread peak in the trailing portion may be equal to or even smaller than the axial extension of the thread peak of the leading portion (compared at said same first and/or second distance), it may advantageously be larger, which is reflecting in at least one example embodiment. Thus, according to one example embodiment, in the axial direction of the fixture a thread peak of the trailing portion has a longer extension than the largest thread peak of said cutting edge of the leading portion, the comparison being made at a same first distance from a respective thread bottom (or core of the fixture) measured perpendicularly to said central axis, and/or in the axial direction of the fixture a thread peak of the trailing portion has a longer extension than the largest thread peak of said cutting edge of the leading portion, the comparison being made at a same second distance from a respective thread top measured perpendicularly to said central axis.

A fixture may have a tapered apical end section of the leading portion to facilitate guiding of the fixture into a bore hole in the bone tissue. The profile of the apical end section of the leading portion may vary. Therefore, in this application, when referring to the axial extension of a thread peak of a cutting edge, what is relevant is the largest profile (at the point or points which will be compared to the corresponding points of the thread peak in the trailing portion), since that is what will form the geometry of the female bone thread. Normally, if a cutting edge extends axially over several thread peaks, at least the most coronal of those thread peaks has said largest profile forming the geometry of the female bone thread. Thus, the axial extension of the thread peak of the trailing portion should be compared with a thread peak(s) of the cutting edge(s) that forms the geometry of the femal bone thread into which the trailing portion of the fixture enters.

The difference in axial extension or displacement may be designed at one or more locations of the thread peaks. For instance, at half the height of the thread peak, i.e. radially halfway between thread bottom and thread top, the axial extension of one or more thread peaks in the trailing portion may be larger than that of the thread peaks of the cutting edge in the leading portion. In such case, it does not matter if the comparison is made at a same distance from a respective thread bottom measured perpendicularly to said central axis, or if the comparison is made at a same distance from a respective thread top measured perpendicularly to said central axis. In such case, the above-mentioned first and second distances are of equal value (assuming that the height of the thread is the same in the leading portion and the trailing portion).

However, if only the thread top of the thread peak of the trailing portion has a larger extension than the thread top of a thread peak of the cutting edge in the leading portion, then the comparison should be made at a same distance measured perpendicularly to the central axis from a thread bottom in the trailing and leading portions, respectively.

Similarly, if in the trailing portion, the thread bottoms separating the thread peaks are partially filled up with more material than the thread bottoms in the leading portion, thus making the lowest section of the thread peak wider in the trailing portion, then the comparison should be made at a same distance measured perpendicularly to the central axis from a thread top in the trailing and leading portions, respectively.

Thus, it should be understood that strain may be achieved by various design modifications of the thread peaks in the trailing portion compared to the thread peaks of the cutting edge(s) in the leading portion. Some embodiments reflecting such possibilities are presented below.

According to at least one example embodiment, the axial extension of a thread top in the trailing portion is longer than the axial extension of a thread top of said largest thread peak of said cutting edge in the leading portion. A thread top is the section of the thread peak which is radially farthest off from the central axis of the fixture. The differentiation in thread top design may be accomplished in different ways, even if the thread tops would be arranged at a constant distance from the central axis of fixture throughout the leading and trailing portions. For instance, a thread top at the cutting edge of the leading portion may form an acute angle, while a thread top at the trailing portion forms an obtuse angle. Another example, would be a thread top forming a substantially straight top of a truncated triangle, the axial extension of which is larger for a thread top in the trailing portion than for a thread top of a cutting edge in the leading portion.

According to at least one example embodiment, a top radius of a thread peak in the trailing portion is larger than a top radius of said largest thread peak of said cutting edge in the leading portion. Thus, while both peaks are rounded or curved at the top, the bending of the curvature at the top of a thread peak in the trailing portion is not as strong as for a top of the cutting edge in the leading portion.

An advantage of widening the thread top or increasing the top radius of a thread peak is that a strain is achievable, without augmenting the stress that is naturally present in the bone around a thread peak of a fixture (compared to if the same strain would be achieved with non-rounded thread tops, e.g. trapezoid-shaped thread tops).

According to at least one example embodiment, the axial extension of a thread bottom between two consecutive thread peaks in the trailing portion is shorter than the axial extension of a thread bottom between two consecutive thread peaks of said cutting edge in the leading portion. In other words, one can picture this as partially filling the profile of the thread bottom at the trailing portion with more fixture material compared to the profile of the thread bottom at the leading portion. Expressed differently, the base of the thread peak in the trailing portion is wider than the base of the thread peak in the cutting edge of the leading portion.

This kind of smaller separation of the thread peaks in the trailing portion compared to the separation of the thread peaks in the leading portion is also reflected in at least one other example embodiment. According to at least one example embodiment, each one of the trailing portion and the cutting edge of the leading portion has a first thread peak and an axially consecutive second thread peak located coronally of the first thread peak, wherein the coronal flank of the first thread peak is axially spaced from the apical flank of the second thread peak, wherein said spacing between the flanks of the first and second thread peaks is smaller in the trailing portion than in the cutting edge of the leading portion. The comparison may be made at a same first distance from a respective thread bottom measured perpendicularly to the central axis of the fixture, or at a same second distance from a respective thread top measured perpendicularly to the central axis of the fixture.

According to at least one example embodiment, a bottom radius between two consecutive thread peaks in the trailing portion is smaller than a bottom radius between two consecutive thread peaks of said cutting edge that form the female thread geometry in the bone. Thus, while the thread bottom between two consecutive peaks are rounded or curved at the top in the trailing portion as well as in the leading portion, the bending of the curvature of the thread bottom in the trailing portion is stronger than for the thread bottom of the cutting edge in the leading portion.

An advantage of narrowing the thread bottom or decreasing the bottom radius between thread peaks is that a strain is achievable, without augmenting the stress that is naturally present in the bone around a thread bottom of a fixture (compared to if the same strain would be achieved with non-rounded thread bottoms, e.g. trapezoid-shaped thread bottoms).

According to at least one example embodiment, said thread peak of said cutting edge of the leading portion and said thread peak of the trailing portion having larger axial extension are provided on a common thread such that said thread peak of the trailing portion will follow in the female thread in the bone formed by the thread peak of said cutting edge in the leading portion. In other words said thread peaks are arranged on a common thread spiral. According to at least some other example embodiments, in addition to said thread spiral, the fixture may be provided with one or more additional thread spirals which are provided only in the leading portion, or only in the trailing portion, or in both the leading and the trailing portion. Thus, in some example embodiments, the fixture may be provided with parallel thread spirals in which at least a first thread spiral has the function of providing a strain by differentiating the design of the thread peaks of said first spiral in the trailing portion relative to the design of the thread peaks of said first spiral in the leading portion. At least a second thread spiral may be void of said strain-providing design. Another conceivable embodiment would be to have both thread spirals providing a respective strain. A further conceivable alternative is to have one thread spiral providing a strain to one bone region, for instance the cancellous bone tissue, and another thread spiral providing a strain to another bone region, for instance the cortical bone tissue.

According to at least one example embodiment, in the trailing portion and the leading portion each thread top of a thread peak interconnects a coronal and an apical flank, wherein at least one of a coronal and an apical flank of a thread peak in the trailing portion is axially displaced relative to a respective mating flank of the female thread cut in the bone tissue by the leading portion, wherein at least one of said coronal and apical flanks of the thread peak in the trailing portion provides a strain to the bone tissue when the fixture is installed in the bone. Thus, it is conceivable to only provide for coronally directed condensation at the trailing portion by having one or more of the coronal flanks in the trailing portion axially overdimensioned relative to the coronal flank(s) of the cutting edge in the leading portion. A counter-acting apically directed condensation will be present in the leading portion. Similarly, it is conceivable to only provide for apically directed condensation at the trailing portion by having one or more of the apical flanks in the trailing portion axially overdimensioned relative to the apical flank(s) of the cutting edge in the leading portion. Furthermore, it is conceivable to provide both coronally and apically directed condensation by having the coronal as well as the apical flanks overdimensioned. Still further, it is conceivable to have, for instance, one thread peak in the trailing portion providing a coronally directed condensation, while having another thread peak in the trailing portion providing an apically directed condensation to the bone. As a further possibility, it is conceivable to have a cyclical alternation of thread peaks providing a coronally and apically directed condensation, respectively. In this manner, it would be possible to condense a bone plug from two sides by two consecutive thread peaks, while the axially subsequent bone plug is left without condensation. Such a design would increase primary stability due to the strain provided to the condensed bone plug, while the non-condensed bone plug may favor healing of the bone.

In use, after implantation, the dental fixture is subject to axial apically directed loads, e.g. during mastication. The largest stresses in the bone caused by an apically directed axial force usually appear at the coronal portion of the fixture thread. That is where the greatest part of the apically directed force is received. By providing a coronally directed condensation, e.g. as exemplified above or in other ways described in this disclosure, said apically directed force will be counteracted and the load distribution in the bone will become more even, at least initially during the sensitive healing-in phase.

According to at least one exemplary embodiment, the flanks of the threads have a straight extension.

According to at least one exemplary embodiment, the flanks of the threads have a curved extension. It is for example conceivable with flanks having a concave curvature. It is also conceivable with flanks having a convex curvature.

Accompanying FIG. 1 is an illustration of the relationship between stress and strain in the cortical bone tissue. The yield point is at the transition between the straight part (elastic deformation zone) and curved part (plastic deformation zone) of the graph. The ultimate strain is at the other end of the curved part.

Accompanying FIG. 2 is an illustration of the relationship between stress and strain in cancellous bone tissue. For cancellous bone, the behavior up to the yield point (i.e. where the straight part of the graph transits into the curved part) substantially corresponds to that in cortical bone. However, as may be seen from FIG. 2, the behavior above the yield point differs somewhat between cancellous bone and cortical bone.

The inventors have realized that a static strain in bone in the range of 0.01-0.3 provides a good bone strength during the healing phase, i.e. above the yield strain (for a normal 70 year old patient the yield strain of cortical bone may be below 0.01). In particular, the inventors have identified that the lower part of the range is suitable for cortical bone, while the upper part of the range is suitable for spongious cancellous bone.

Thus, according to at least one example embodiment, said strain-providing thread peak of the trailing portion is compared to said largest thread peak of said cutting edge in the leading portion, dimensioned such that the strain provided to the bone is in the range of 0.01-0.3.

According to at least one example embodiment, said strain-providing thread peak of the trailing portion is compared to said largest thread peak of said cutting edge in the leading portion, dimensioned such that the strain provided to the bone is in the range of 0.01-0.1, such as in the range of 0.01-0.03, suitably in the range of 0.01-0.02.

The strain range of 0.01-0.02 is normally between the yield strain and ultimate strain of human cortical bone. However, as mentioned previously, even with strains exceeding the ultimate strain of human cortical bone, beneficial effects may be accomplished. Of course, for cancellous bone, considerably higher strains may be applied to the bone, since in cancellous bone the yield strain and ultimate strain are much higher than for cortical bone. This is reflected in at least one example embodiment in which said strain-providing thread peak of the trailing portion is compared to said largest thread peak of said cutting edge in the leading portion, dimensioned such that the strain provided to the bone is in the range of 0.06-0.3, suitably in the range of 0.06-0.1. While the narrower range may still be suitable for use in cortical bone, the wider range is also suitable for cancellous bone. It should be understood that the above-mentioned strain ranges may be achieved either by at least locally overdimensioning the strain-providing thread peak or thread peaks relative to the largest thread peak of the cutting edge, or by axially displacing the helical path comprising the strain-providing thread peak relative to the helical path comprising the thread peak of the cutting edge.

Cortical bone will generally be in contact with a coronal fixture portion and cancellous bone will generally be in contact with an intermediate and an apical fixture portion. This is reflected in the following embodiments.

According to at least one example embodiment, the trailing portion is included in a coronal fixture portion adapted to engage with cortical bone tissue, wherein the displacement of said second area of a thread peak of the trailing portion compared to said imaginary continuation into the trailing portion of said largest thread peak of said cutting edge following said lead, is such that the strain provided to the bone is in the range of 0.01-0.3, such as in the range of 0.01-0.1, suitably in the range of 0.01-0.03, such as in the range of 0.01-0.02.

According to at least one example embodiment, the trailing portion is included in an intermediate fixture portion adapted to engage with cancellous bone tissue, wherein the displacement of said second area of a thread peak of the trailing portion compared to said imaginary continuation into the trailing portion of said largest thread peak of said cutting edge following said lead, is such that the strain provided to the bone is in the range of 0.01-0.3, such as 0.06-0.3, suitably in the range of 0.06-0.1.

According to at least one example embodiment, several axially spaced thread peaks in the trailing portion are adapted to provide a strain to the bone. Suitably, the axial length covered by said several axially spaced thread peaks in the trailing portion is about 0.5-4 mm, suitably 1-3 mm. This may for instance be achieved by the previously discussed axial displacement of the helical paths of the threads of the trailing portion and the cutting edge in the leading portion, respectively. Alternatively, several axially spaced thread peaks in the trailing portion may be overdimensioned as previously discussed, which is also reflected in the following embodiments.

According to at least one example embodiment, several axially spaced thread peaks in the trailing portion have said larger extension in the axial direction compared to a thread peak of said cutting edge in the leading portion, wherein the axial length covered by said several axially spaced thread peaks in the trailing portion is about 0.5-4 mm, suitably 1-3 mm. Such axial length substantially corresponds to normal thickness of cortical bone. Thus, fixtures according to such an embodiment are particularly suitable for applying a static strain to the cortical bone. Therefore, suitably, the trailing portion is a coronal end portion of the bone apposition surface of the fixture.

According to at least one example embodiment, several axially spaced thread peaks in the trailing portion have said larger extension in the axial direction compared to a thread peak of said cutting edge in the leading portion, wherein the axial length covered by said several axially spaced thread peaks in the trailing portion is greater than 1 mm, such as greater than 3 mm, suitably greater than 4 mm. Fixtures according to such an embodiment are suitable for cancellous bone, which is located apically of the cortical bone. Thus, the axial length should be large enough to reach through the cortical bone and down to the cancellous bone. Suitably, for such an installation of a fixture, the portion of the bore hole at the cortical bone may be pre-tapped with somewhat wider female bone threads than what will be created in the cancellous portion, in order to avoid too high strain provided by the trailing portion on the cortical bone. This will allow a high strain to be applied to the cancellous bone, without providing the same high strain to the cortical bone.

Although in at least one example embodiment, the fixture does not comprise any other threaded portions apart from the leading and trailing portions, in other example embodiments the fixture may, for instance, comprise one or more threaded additional portions, such as coronally of the trailing portion.

According to at least one example embodiment, the threads in the trailing portion are microthreads. In an alternative embodiment, only parts of the threads in the trailing portion are microthreads. In yet an alternative embodiment, the threads in the trailing portion are macrothreads. According to at least one additional or alternative example embodiment, at feast a coronal portion of the leading portion is provided with microthreads. According to at least a further example embodiment, at least one cutting edge is present in the microthreads of a coronal portion of the leading portion.

According to at least one example embodiment, for an axial sequence of thread peaks in the trailing portion, a thread peak located coronally of another thread peak has a larger axial extension. This may be suitable in order to compensate for any grinding effect on the bone caused by the threading during insertion. Thus, there may be a gradual increase in width for the thread peaks in the trailing portion.

According to at least one example embodiment the trailing portion is cylindrical. Thus, the trailing portion may have thread peaks which are tangential to a geometrical plane that is parallel to the central axis of the fixture. According to at least one embodiment, at least one axial section of the leading portion is cylindrical.

The inventive fixture may be applicable to different parts of the human bone tissue. According to at least one example embodiment, said fixture is a dental fixture for arrangement in jawbone.

According to at least a second aspect of the invention, a fixture for insertion into a bore hole arranged in bone tissue is provided. The fixture is cylindrical and has a geometrical central axis and comprises
a leading portion provided with at least one cutting edge for creating a female thread in the bone tissue, and
a trailing portion following the leading portion in the created female thread,
wherein both of said portions comprise a respective outer surface being threaded for engagement with bone tissue, wherein thread tops and thread bottoms are provided alternatingly in the axial direction of the fixture, each thread top forming part of a thread peak arranged between two consecutive thread bottoms, wherein
compared to the geometry of the female thread created by a thread peak of said cutting edge of the leading portion, a thread peak of the trailing portion is overdimensioned in at feast one of the coronal and apical directions of the fixture so that a strain is provided to the bone.

The fixture according to the second aspect of the invention may have any single one of the features or combination of features discussed in connection with the fixture according to the first aspect of the invention.

According to at least a third aspect of the invention, a fixture for insertion into a bore hole arranged in bone tissue is provided. The fixture has a geometrical central axis and comprises
a leading portion provided with at least one cutting edge for creating a female thread in the bone tissue, and a trailing portion following the leading portion in the created female thread, wherein both of said portions comprise a respective outer surface being threaded for engagement with bone tissue, wherein thread tops and thread bottoms are provided alternatingly in the axial direction of the fixture, each thread top forming part of a thread peak arranged between two consecutive thread bottoms, wherein compared to the geometry of a thread peak of said cutting edge of the leading portion, a thread peak of the trailing portion is overdimensioned in at least one of the coronal and apical directions of the fixture so that a strain is provided to the bone when said overdimensioned thread peak engages with the created female thread, the comparison being made at a same first distance from a respective thread bottom measured perpendicularly to said central axis, and/or the comparison being made at a same second distance from a respective thread top measured perpendicularly to said central axis.

The fixture according to the third aspect of the invention may have any single one of the features or combination of features discussed in connection with the fixtures according to the first and second aspects of the invention.

According to at least a fourth aspect of the invention, a fixture set is provided. The fixture set comprises a fixture comprising a condensation portion, a thread maker provided with at least one cutting edge and adapted to be rotated into a bore hole arranged in bone tissue for making a female thread in the bone tissue prior to insertion of said fixture, the thread maker comprising a threaded outer surface, wherein thread tops and thread bottoms are provided alternatingly in the axial direction of the thread maker, each thread top forming part of a thread peak arranged between two consecutive thread bottoms, wherein said condensation portion of the fixture comprises an outer surface being threaded for engagement with bone tissue, wherein thread tops and thread bottoms are provided alternatingly in the axial direction of the fixture, each thread top forming part of a thread peak arranged between two consecutive thread bottoms, wherein compared to the geometry of a thread peak of said cutting edge of the thread maker, a thread peak of said condensation portion of the fixture portion is overdimensioned in at least one of the coronal and apical directions of the fixture so that a strain is provided to the bone when said overdimensioned thread peak engages with the created female thread, the comparison being made at a same first distance from a respective thread bottom measured perpendicularly to a respective central axis of the thread maker and the fixture, and/or the comparison being made at a same second distance from a respective thread top measured perpendicularly to a respective central axis of the thread maker and the fixture.

According to at least a fifth aspect of the invention, a fixture set is provided. The fixture set comprises a fixture comprising a leading portion and a trailing condensation portion, wherein both of said portions comprise a respective outer surface being threaded for engagement with bone tissue, wherein thread tops and thread bottoms are provided alternatingly in the axial direction of the fixture, each thread top forming part of a thread peak arranged between two consecutive thread bottoms, a thread maker provided with at least one cutting edge and adapted to be rotated into a bore hole arranged in bone tissue for making a female thread in the bone tissue prior to insertion of said fixture, wherein the thread of the leading portion is adapted to mate with the female bone thread and has the same lead as a thread of the thread maker, wherein the lead of the thread in the leading portion defines a first helical path in the leading portion, wherein a thread peak of the trailing portion forms part of a thread having a lead defining a second helical path which is partly axially displaced relative to an imaginary extension into the trailing portion of the first helical path.

Thus, the fixture sets according to the fourth and fifth aspects of the invention can achieve the same kind of strain as the fixtures according to the first, second and third aspects of the invention. According to the first, second and third aspects of the invention, the fixture itself, being provided with a cutting edge of a leading portion, creates the female thread in the bone tissue in which the trailing portion shall follow. According to the fourth and fifth aspects of the invention, a separate thread maker is provided for creating the female thread in the bone tissue, prior to insertion of the fixture. Then, when the fixture is inserted a condensation portion (corresponding to said trailing portion) of the fixture will engage with the female bone threads and provide the strain. Thus, the lead of the threads on the fixture and the threads on the thread maker should suitably be the same, although they may be axially displaced relative to each other (see fifth aspect).

The fixtures used in the fixture set according to the fourth and fifth aspects of the invention may have any one of the features or combination of features presented for the fixtures according to the first, second and third aspects of the invention. They may even have the cutting edge, although it is not necessary since the female thread will be created by the separate thread maker.

According to at least a sixth aspect of the invention, there is provided a method of inserting a fixture, such as a dental fixture, into a bore hole arranged in bone tissue. The method comprises:

creating a female thread in a surface of the bone tissue defining the bore hole, inserting a condensation portion of a fixture having a male thread into the bore hole for mating with the female thread, wherein a first area of a thread peak of the male thread is aligned with a thread peak of the mating female thread and a second area of said thread peak of the male thread is axially displaced by comparison with said thread peak of the mating female thread, thereby providing a strain to the bone when said thread peak of the male thread engages with the created female thread, the comparison of the thread peaks being made at a same first distance from a respective thread bottom measured perpendicularly to a central axis of the bore hole, and/or at a same second distance from a respective thread top measured perpendicularly to said central axis.

The step of creating a female thread may either be achieved by the fixture itself, such as a fixture according to any one of the first, second and third aspects of the invention, or by a separate thread maker, such as a thread maker according to any one of the fourth and fifth aspects of the invention. The fixture may be provided with a cutting edge if it is used both for creating the female thread and providing a strain to the bone with its condensation portion. Alternatively, the fixture may be void of cutting edges and be inserted with its condensation portion after a separate thread maker has created the female thread.

The fixture in any one of the aspects of the invention may be a dental fixture comprised in a dental implant. A dental implant may, in addition to the dental fixture, also comprise a superstructure, such as an abutment.

The dental fixture is for use as the anchoring member of a dental prosthesis. To this end, the dental fixture is insertable into a pre-prepared bore hole in the bone tissue of a jawbone (maxilla or mandible) at a site where the dental prosthesis is required. The dental fixture is normally rotated into the bore hole.

The dental fixture is a screw-type dental fixture. To this end the bore hole may be provided with internal (female) threads, in advance or may be left un-tapped with the dental fixture provided with a self-tapping capacity, e.g. by the provision of one or more axially-extending cutting recesses, edges or notches, etc in the fixture thread. For instance, an apical end portion of the fixture may be provided with 2-4 cutting recesses, such as 3 cutting recesses. Other number of cutting recesses are readily conceivable.

A superstructure for connecting a prosthetic part to the fixture may comprise an abutment, spacer or other transmusosal component which engages to the dental fixture to bridge the gingiva overlying the maxilla or mandible. The prosthetic part, e.g. a crown, bridge or denture may be secured to the abutment. There are various other forms that the superstructure can take. For instance, the prosthetic part may be secured directly to the dental fixture. A dental implant may thus comprise an abutment connected to the dental fixture, or the dental fixture without an abutment.

The term "coronal" is here and throughout this application used to indicate a direction towards a head end or trailing end of the dental implant. For instance, in a situation where an abutment is connected to a dental fixture, the coronal direction of the abutment would be a direction towards the part of the abutment being directed away from the fixture. Conversely, the term "apical" indicates a direction towards an insertion or leading end of the component. Thus, apical and coronal are opposite directions. Furthermore, the terms "axial", "axial direction" or "axially" are used throughout this application to indicate a direction taken from the coronal end to the apical end, or vice versa. The terms "radial", "radial direction" or "radially" indicate a direction perpendicular to the axial direction.

A blind bore or socket may extend apically into the fixture body from the coronal end to an end surface in-between the apical and coronal ends of the fixture body for a superstructure to be secured to the fixture. The socket may comprise an internally-threaded section for screw connection of the superstructure to the fixture. A rotational lock for the superstructure may be provided in the socket, such as an internal polygonal side wall, e.g. hexagonal, or alternatively one or more protrusions from or indentations in the wall of the socket. A section of the socket, such as the coronal section, may be tapered towards the apical end. The tapered section is suitably arranged coronally of the internally-threaded section.

The fixture may be used in a one stage procedure or a two stage procedure. In a one stage procedure a healing or temporary abutment is connected to the fixture to form the gingival tissue, and after a healing period the healing or temporary abutment is replaced by a permanent abutment. For a two stage procedure the fixture is provided with a cover screw and the gingival tissue is sutured over the fixture and cover screw, and after a healing period the tissue is opened up and an abutment is connected to the fixture after removal of the cover screw.

A conceivable alternative to having an abutment connected to the fixture is to have a one-piece implant, wherein a portion of the implant is embedded in bone tissue, while another portion of the implant extends from the bone tissue across the gingiva.

The fixture may have a conically tapering end portion which tapers towards the coronal end. The axial extent of this coronal end portion is small compared to the total length of the fixture, as an example no more than 4% of the total length, such as in the range of 1.5%-3.7%. The coronal end portion may suitably be provided without a threaded surface, e.g. having a smooth or a roughened (such as blasted) surface.

The fixture may have a substantially flat coronal end surface which is perpendicular to the longitudinal axis of the fixture. Alternatively, the coronal end surface may have a sloped contour relative to the longitudinal axis of the fixture, e.g. such that when positioned within the jawbone the length of the fixture is larger on a lingual side and shorter on a buccal side of the fixture. Another alternative is a saddle-shaped or wave-like coronal end surface.

The length of the dental fixture may be in the range of 5-19 mm, depending on the clinical situation. The outer diameter of the dental fixture may suitably be in the range of 2-6 mm, such as 3-5 mm.

The fixture may be substantially cylindrical or slightly tapering from the coronal end towards the apical end. If the fixture has a slight tapering, the core of the fixture and the outer periphery defined by e.g. thread tops may have the same or different angle of taper. Furthermore, the core of the fixture may be cylindrical while the thread tops describe a conicity or, conversely, the core of the fixture may be tapered while the thread tops describe a generally cylindrical geometry. Alternatively, the fixture may comprise a combination of one or more cylindrical and/or one or more tapering portions. Thus, one or more portions of the fixture may have e.g. thread tops lying in a common imaginary cylindrical surface, which cylindrical surface is parallel with the longitudinal axis of the fixture. Alternatively or additionally, one or more portions of the fixture may have thread tops lying in an imaginary conical surface which in the apical direction is tapering towards the longitudinal axis.

The externally threaded fixture may comprise one or more thread spirals.

The term "pitch" is used to indicate the axial distance between adjacent tops of a threading. The term "lead" is used to indicate the distance advanced parallel to the longitudinal axis when the fixture is turned one revolution, i.e. it corresponds to the pitch multiplied with the number of thread spirals. For a single thread spiral having a constant pitch, the lead is equal to the pitch; for a double thread spiral, the lead is twice the pitch.

The term "microthread" is used to indicate a thread having a height which is no greater than 0.2 mm. According to at least one example embodiment, the fixture is provided with microthreads having a height in the range of 0.02-0.2 mm, such as 0.05-0.015 mm, for instance 0.1 mm. The term "macrothread" is used to indicate a thread having a height which is greater than 0.2 mm. According to at least one example embodiment, the fixture is provided with macrothreads having a height in the range of 0.25-0.35 mm, such as 0.3 mm.

Suitably, microthreads may be located coronally of macrothreads. For instance, microthreads may be arranged to engage dense cortical bone and macrothreads may be arranged to engage porous spongious/cancellous bone. The lead of a microthread suitably corresponds to the lead of a macrothread. The macrothread pitch may, as an example, be 2-4 times, such as 3 times, the pitch of the microthreads. The pitch (top-to-top spacing) at a fixture portion provided with microthreads may be around 0.10-0.30 mm, for instance 0.20-0.24 mm. The pitch (top-to-top spacing) at a fixture portion provided with macrothreads may be around 0.30-0.90 mm, for instance 0.60-0.72 mm.

Microthreads can be regarded as defined, oriented roughness. A non-oriented roughness having smaller dimensions, for instance obtained by blasting, etching, etc., may be superimposed on microthreads as well as on macrothreads.

A thread profile may comprise two flanks, a top interconnecting said two flanks, a bottom formed between two adjacent threads, said flanks forming an acute angle v with a plane which is perpendicular to the fixture axis and which angle v lies in a plane containing the extension of the fixture axis, said profile further having a height D. The top may be curved and may have a top radius. Suitably, for $10° \leq v < 35°$, the top radius is greater than $0.4 \times D$ and, for $35° \leq v < 55°$, the top radius is greater than $0.2 \times D$.

DETAILED DESCRIPTION OF THE DRAWINGS

Figure 1:
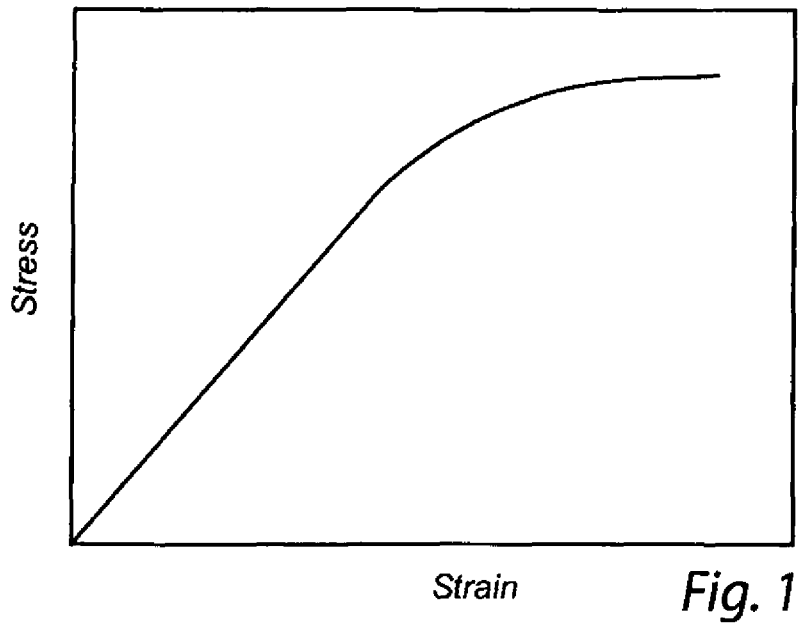
FIG. 1 is a graph illustrating a stress/strain relationship for cortical bone.

FIG. 1 is a graph illustrating a stress/strain relationship for cortical bone. In an article by McCalden R. W. et al. the relationship between ultimate strain and age is presented (McCalden R. W. et al., *Age-related changes in the tensile properties of cortical bone*, The Journal of Bone and Joint Surgery, Vol. 75-A. No. 8, August 1993). From the article, one learns that the ultimate strain is substantially linearly dependent on the person's age. For instance, an 80 year old person has in cortical bone an ultimate strain of about 0.015, a 50 year old person has an ultimate strain of about 0.025, while a 20 year old person has an ultimate strain of about 0.035. For cortical bone the yield strain is about half the ultimate strain. For instance, with reference to FIG. 1, in a 20 year old person, for a strain up to about 0.018, the stress/strain relationship could be linear and represents an elastic deformation of the bone. The interval between 0.018 and 0.035 is non-linear and represents a plastic deformation of the cortical bone. Similarly, for an 80 year old person, a strain up to 0.008 would correspond to the linear relationship and the interval between 0.008 and 0.015 would correspond to the non-linear relationship in FIG. 1.

Strain may be provided to the bone in different ways. For instance the bone may be affected by an axial displacement/pressure or a radial displacement/pressure. An axial displacement/pressure may result in an axial strain and/or a radial strain. Similarly, a radial displacement/pressure may in addition to radial strain also result in axial strain to the bone.

EXAMPLE

Screw shaped fixtures, manufactured from commercially pure titanium, grade 4, were used. In order to reduce a possible grinding effect during insertion the fixtures had a turned surface. The endosseous part of the fixtures comprised three different portions; one leading (cutting) portion, one transition portion with a gradual increase in diameter and one trailing (condensation) portion. The bone bed was drilled to a final drill diameter of 3.3 mm corresponding to the core diameter ($2r_b$) of the cutting portion of the fixture. When the fixture was inserted the cutting features created a cavity in the bone which was congruent with the fixture shape of the cutting portion. When the transition portion entered the bone it created a gradual increase in the strains in the surrounding bone without cutting. When finally the condensation portion entered the bone the predetermined bone condensation was obtained. The fixtures were installed with a standardized rotation speed of 20 revolutions/minute. Two types of test fixtures were used; one where the increase in diameter was 0.15 mm (referred to as "Group 0.15") and another with a diameter increase of 0.05 mm (referred to as "Group 0.05"). The control fixtures had no diameter increase.

The fixtures were inserted in tibia of rabbits. Test fixtures were always inserted in the left leg and control fixtures in the right leg. Group 0.15 fixtures were installed proximally in the proximal tibia metaphysis. Group 0.05 fixtures were installed distally in the proximal tibia metaphysis.

After 3.5 weeks, all fixtures were subjected to removal torque (RTQ) tests. The peak RTQ was investigated with a computerized control RTQ device, in which the values were transmitted at a frequency of 100 per second to the computer via a control box.

The fixture head was connected to the instrument, and an increasing reverse torque was applied to all the fixtures until failure of the bone-fixture interface occurred. The first peak values of resistance to reverse torque rotation were recorded in Ncm.

Prior to the animal experiment a 2D axisymmetric finite element model of the trailing portion of the fixture and the surrounding bone was developed. The fixture and the bone were modelled in a CAD software Pro/Engineer (PTC Corporate Needham, Mass. USA) and then transferred into the finite element software ANSYS 12.01 (ANSYS, Inc. Canonsburg, Pa., USA). The strain in the bone was induced by radial displacement of the fixture surface by 0.025 mm and 0.075 mm simulating a diameter increase of 0.05 mm and 0.15 mm respectively. The simulated maximum principal strain in the surrounding bone for Group 0.15 fixtures was ~0.045 (0.15 mm divided by 3.3 mm=0.045). For group 0.05 fixtures the maximum principal strain obtained was ~0.015 (0.05 mm divided by 3.3 mm=0.015).

In all sites the removal torque of the test fixtures was higher than that of the corresponding control fixtures. See Table 1.

TABLE 1

Comparison between removal torque for test fixtures and control fixtures.

| Removal | Average torque Test Ncm (Std) | Average torque Control Ncm (Std) |
| --- | --- | --- |
| Tibia proximal (Group 0.15) | 26.0 (6.89) | 16.8 (7.83) |
| Tibia distal (Group 0.05) | 23.0 (5.31) | 17.2 (5.29) |

Strain in cortical bone from rabbits has been measured by Shunmugasamy V. C. et al. and presented in an article (Shunmugasamy V. C. et al., *High strain rate response of rabbit femur bones*. Journal of Biomechanics, 2010; 43: 3044-3050). The ultimate strain of rabbit cortical bone was measured to be about 0.02.

In the present study the fixtures were just supported by cortical bone. It should be noted that the Group 0.15 fixtures gave rise to strains (0.045) which exceeded the ultimate strain (~0.02) of cortical rabbit bone. In spite of this there was no evidence of reduced removal torque. On the contrary the removal torque of the experimental fixtures was higher than that of the control fixtures which were designed not to produce static strains in the bone. It is striking that the very highest removal torque was obtained for Group 0.15 fixtures for which the strains induced by far exceeded the ultimate strains. From the values in Table 1, one can simply calculate that for Group 0.15 fixtures the removal torque was increased by 55%, and for Group 0.05 fixtures the removal torque was increased by 34%. Obviously, the stresses in the bone, which were induced during fixture insertion, are maintained for a considerable time.

This study indicates that an increased strain provides better initial fixture stability, it is also noticeable that increased strain provides a better stability after 3.5 weeks.

In the above-mentioned article by McCalden R. W one learns that the ultimate strain is substantially linearly dependent on the person's age. The above discussed ultimate strain (~0.02 of rabbits) can be seen for a 70 year old person. While the rabbit experiments in the above discussed example showed a successful result for a strain of 0.045, which by far exceeds the ultimate strain of cortical rabbit bone (2¼ times the ultimate strain of cortical rabbit bone), and also exceeds the ultimate strain of cortical bone of a 70 year old human, it is anticipated that an even higher strain would be successful in a younger person's cortical bone. For a 20 year old person, it would correspond to applying a strain of about 0.08 (2¼ times the ultimate strain 0.035 of a 20 year old person). For a child or adolescent the ultimate strain is even higher, for instance 0.04, which means that a strain of 0.09 could be applied. The rabbit study in the above example did not measure the upper limit for suitable static strain, but since the Group 0.15 fixtures surprisingly provided an even better result than the 0.05 fixture, it is reasonable to assume that even higher strains relative to the ultimate strain may be suitable for cortical bone.

While the above study analyzed the strain in cortical bone, an analogy may be made to strains in cancellous bone. Thus, similarly to the previous explanations with regard to providing a strain in cortical bone above the yield strain, a beneficial biological response may also be triggered by providing a strain in cancellous bone above the yield strain of the cancellous bone.

Figure 2:
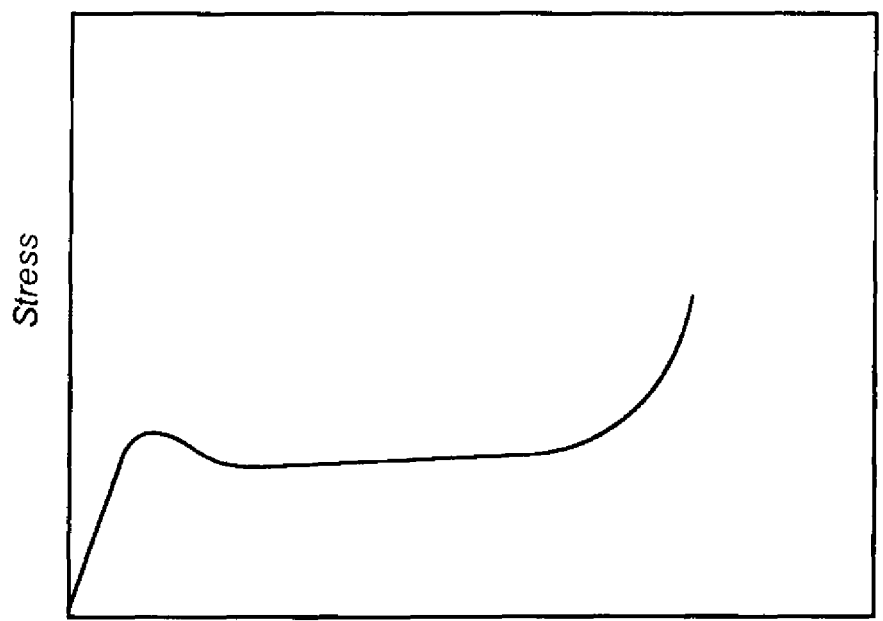
FIG. 2 is a graph illustrating a stress/strain relationship for cancellous bone.

FIG. 2 is a graph illustrating a stress/strain relationship for cancellous bone. The behavior of the graph up to the yield point is similar to that of FIG. 1, i.e. a linear relationship is presented. However, the curved part above the yield point is different and more stretched. According to Gibson, the yield strain is about 0.06 for cancellous bone (Gibson, J. Biomechanics, Vol. 18, No. 5, pp 317-328, 1985). Drawing conclusions from an article by Kold S. et al. (Kold S. et al., *Compacted cancellous bone has a spring-back effect*. Acta Orthopaedica Scandinavica, 2003; 74(5): 591-595) the yield strain for cancellous bone may be even higher. According to Kold S. et al. a bore hole of 5.0 mm in diameter was made in cancellous bone. The bone was then compacted by expanding the bore to 5.6 mm, after which the bone sprung back. During the compaction, the strain ΔD/D on the cancellous bone was therefore 0.6/5=0.12. Thus, the yield strain in cancellous bone is multiple that of the yield strain in cortical bone. In addition, the plastic deformation of cancellous bone is much more stretched than for cortical bone. Thus, since a strain level of 0.1 is considered by the inventors to be suitable for cortical bone tissue, at least for some age groups, a strain level of 0.3 should be suitable for cancellous bone tissue.

Figure 3:
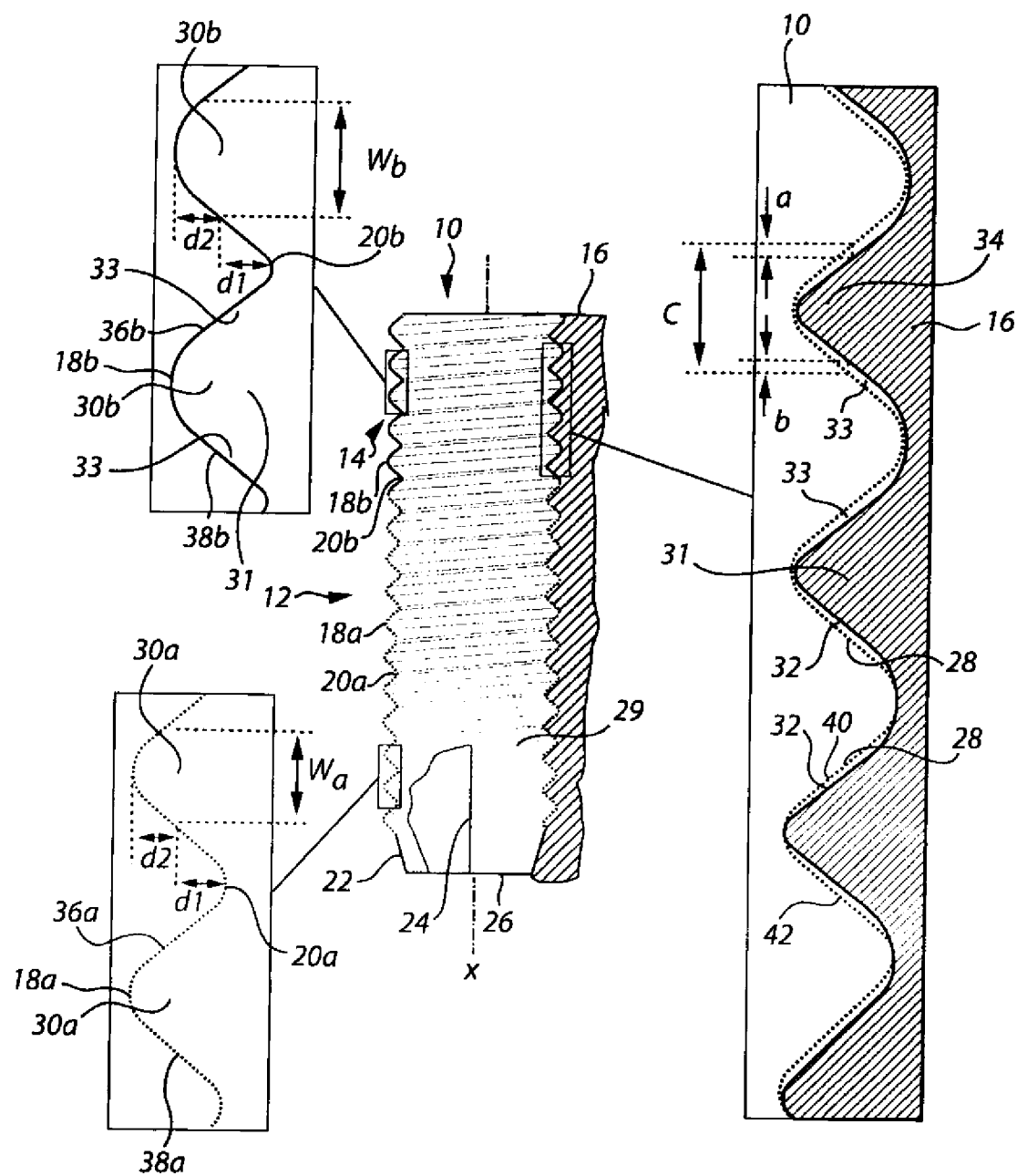
FIG. 3 is a side view illustrating schematically a fixture according to at least one example embodiment of the invention.

FIG. 3 is a side view illustrating schematically a fixture 10, such as a dental fixture, according to at least one example embodiment of the invention. The fixture 10 has a geometrical central axis X. The fixture 10 comprises a leading portion 12 and a trailing portion 14 located coronally of the leading portion 12. Both of said portions 12, 14 present a respective outer surface being threaded for engagement with the bone tissue 16, wherein thread tops 18a, 18b and thread bottoms 20a, 20b are provided alternatingly in the axial direction of the fixture 10. In the drawing, the profile of the threading of the leading portion 12 is illustrated by a dotted line, while the profile of the threading of the trailing portion 14 is illustrated by a full line.

In the illustrated example, the leading portion 12 of the fixture 10 is substantially cylindrical and extends from the trailing portion 14 to a tapering apical guiding portion 22. The leading portion 12 will substantially be in contact with cancellous bone when the fixture 10 has been installed. The trailing portion 14 will substantially be in contact with cortical bone when the fixture 10 has been installed. Furthermore, in the illustrated example, the trailing portion 14 is also substantially cylindrical.

Although, FIG. 3 illustrates that the apical guiding portion 22 is slightly tapering in the apical direction and is provided with one or more cutting edges 24, other alternatives are also conceivable, e.g. a tapering or non-tapering apical portion without cutting edges.

One cutting edge 24 is illustrated in the drawing, however, there may suitably be provided more cutting edges around the fixture. The cutting edge 24 extends from the apical end 26 of the fixture 10 and into part of the leading portion 12.

The cutting 24 edge will make a female thread 28 in the bone tissue 16, the geometry of which will be complementary to the geometry of the threading in the leading portion 12. The female thread 28 that is initially created by the cutting edge 24 is illustrated with a dotted line in the enlarged detailed view on the right hand side of FIG. 3.

In the lower left enlarged detailed view in FIG. 3 the profile of two consecutive thread peaks 30a in the leading portion 12 is illustrated with the dotted line. The thread peaks 30a are separated by a thread bottom 20a.

In the upper left enlarged detailed view in FIG. 3 the profile of two consecutive thread peaks 30b in the trailing portion 14 is illustrated, the thread peaks 30b being separated by a thread bottom 20b.

The thread peaks 30a of said cutting edge 24 of the leading portion 12 and said thread peaks 30b of the trailing portion 14 are provided on a common thread such that said thread peaks 30b of the trailing portion 14 will follow in the female thread 28 in the bone formed by the thread peaks 30a of said cutting edge 24 in the leading portion 12.

When comparing the width of the thread peaks, the following may be noted. In the axial direction of the fixture 10 a thread peak 30b of the trailing portion 14 has a larger extension (width Wb) than the extension (width Wa) of a thread peak 30a of said cutting edge 24 of the leading portion 12. The thread peak 30b of the trailing portion 14 is overdimensioned in both the coronal and apical directions compared to the thread peak 30a of the cutting edge 24 of the leading portion 12. The comparison can be made at a same first distance d1 from a respective thread bottom 20a, 20b measured perpendicularly to said central axis X, and/or the comparison can be made at a same second distance d2 from a respective thread top 18a, 18b measured perpendicularly to said central axis X.

The effect of the difference in axial extension of the thread peaks is illustrated in the enlarged detailed view on the right side of FIG. 3. The detailed view shows the interface between the fixture 10 and the bone 16, both before and after installation of the fixture 10. The dotted line 28 shows the geometry initially cut by the cutting edge 24 of the leading portion 12. The full line 32 shows the final geometry, i.e. when the female bone threads have received the overdimensioned threads of the trailing portion 14 and therefore have been condensed in the axial direction.

Although the thread peaks 30a at the cutting edge 24 are illustrated as having the same height and width, thus each one being a "largest thread peak", it is common that fixtures have smaller thread peaks towards the apical section of the cutting edge 24 and the largest thread peaks towards the coronal section of the cutting edge 24.

The thread peaks 30a of the cutting edge 24 of the leading portion 12 form part of a thread 29 having a lead. A central first area 31 of the respective thread peaks 30b of the trailing portion 14 is aligned with an imaginary continuation into the trailing portion 14 of said thread peak 30a of the cutting edge 24 following said lead. Flanking second areas 33 of the respective thread peaks 30b of the trailing portion 14 are axially displaced by comparison with an imaginary continuation into the trailing 14 portion of said thread peak 30a of the cutting edge 24 following said lead. This could also be explained with reference to the enlarged detailed view on the right side of FIG. 3, which could represent the trailing portion. The dotted line 28 would represent the imaginary continuation into the trailing portion of the thread peaks 30a of the cutting edge 24 following said lead of the thread 29. The full line 32 would represent the thread peaks 30b of the trailing portion. The spaces between the dotted line 28 and the full line 32 represent said second areas 33 of the thread peaks the trailing portion that are axially displaced. Thus, the contour/geometry of said thread peak 30b in the trailing portion 12 has second areas 33 which are located outside the imagined continuation of the contour/geometry of said largest thread peak 30a of the cutting edge 24.

Analyzing the effect on one bone plug 34, at a certain perpendicular distance from the central axis, the local strain on the bone is given by (a+b)/c, wherein a is the distance condensed on the coronal side of the bone plug, b is the distance condensed on the apical side of the bone plug, and c is the local axial extension of the bone plug prior to the condensation. For instance, if a=0.006 mm, b=0.004 mm and c=0.2 mm, then the strain on the bone plug will be (0.006+0.004)/0.2=0.05.

Thus, by appropriately dimensioning the peak-to-peak spacing and the axial extensions of the peaks in the different fixture portions, it is possible to provide a fixtures which creates the static strain levels that have been discussed under the heading "Summary of the invention".

In the leading portion 12 and the trailing portion 14 each thread top 18a, 18b interconnects a coronal flank 36a, 36b and an apical flank 38a, 38b. Both the coronal flank 36b and the apical flank 38b of a thread peak 30b in the trailing portion 14 is axially displaced relative to a respective mating flank 42, 40 of the female thread 28 cut in the bone tissue 16 by the leading portion 12, wherein both of said coronal flank 36b and apical flank 38b of the thread peak 30b in the trailing portion 14 provide a strain to the bone tissue 16 when the fixture 10 is installed in the bone.

Compared to the geometry of the thread peaks 30a of said cutting edge 24 of the leading portion 12, the thread peak 30b of the trailing portion 14 is overdimensioned in both the coronal and apical directions of the fixture so that a strain is provided to the bone 16 when said overdimensioned thread peak engages with the created female thread 28. However, as mentioned previously, in other embodiments it is conceivable to have an individual thread peak in the trailing portion overdimensioned in only one of the coronal and apical directions compared to the thread peak of the cutting edge in the leading portion and the corresponding geometry of the female thread in the bone.

Figure 4:
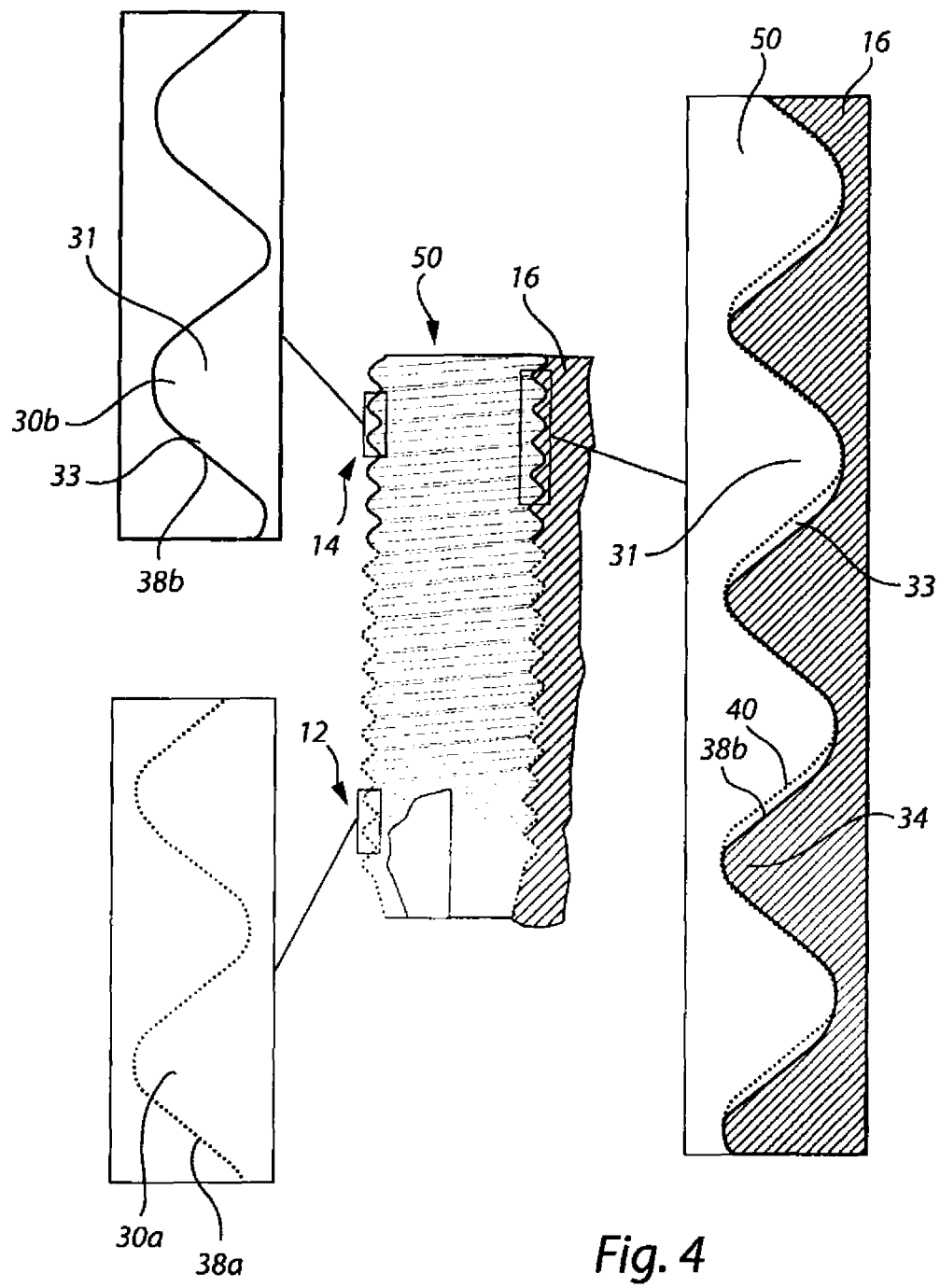
FIG. 4 is a side view illustrating schematically a fixture according to at least another example embodiment of the invention.

FIG. 4 is a side view illustrating schematically a fixture 50 according to at least another example embodiment of the invention. This fixture 50 is similar to the fixture 10 illustrated in FIG. 3. However, in FIG. 4, only the apical flanks 38b of the thread peaks 30b in the trailing portion 14 have been displaced in relation to the apical flanks 38a of the thread peaks 30a in the leading portion 12, and thus in relation to the mating flank 40 of the bone plug 34 (N.B. on the coronal side of the bone plug 34). The displacement of the apical flanks 38b is obtained by overdimensioning the respective thread peaks 30b of the trailing portion 14. More specifically, a second area 33 has been added apically to a first area 31 of the thread peak 30b, said first area 31 having the same contour as the thread peak 30a of the leading portion 12. As can be seen in FIG. 4, the thread peak 30b in the trailing portion 14 obtains a change of top radius approximately at the centre of the thread top. In the enlarged detailed view on the right side of FIG. 4 the mating flank 40 is illustrated with a dotted line representing the geometry before the trailing portion 14 has mated and condensed the bone tissue 16. Thus, in the equation presented in connection with the discussion of FIG. 3, the value of b would be zero in FIG. 4.

Figure 5:
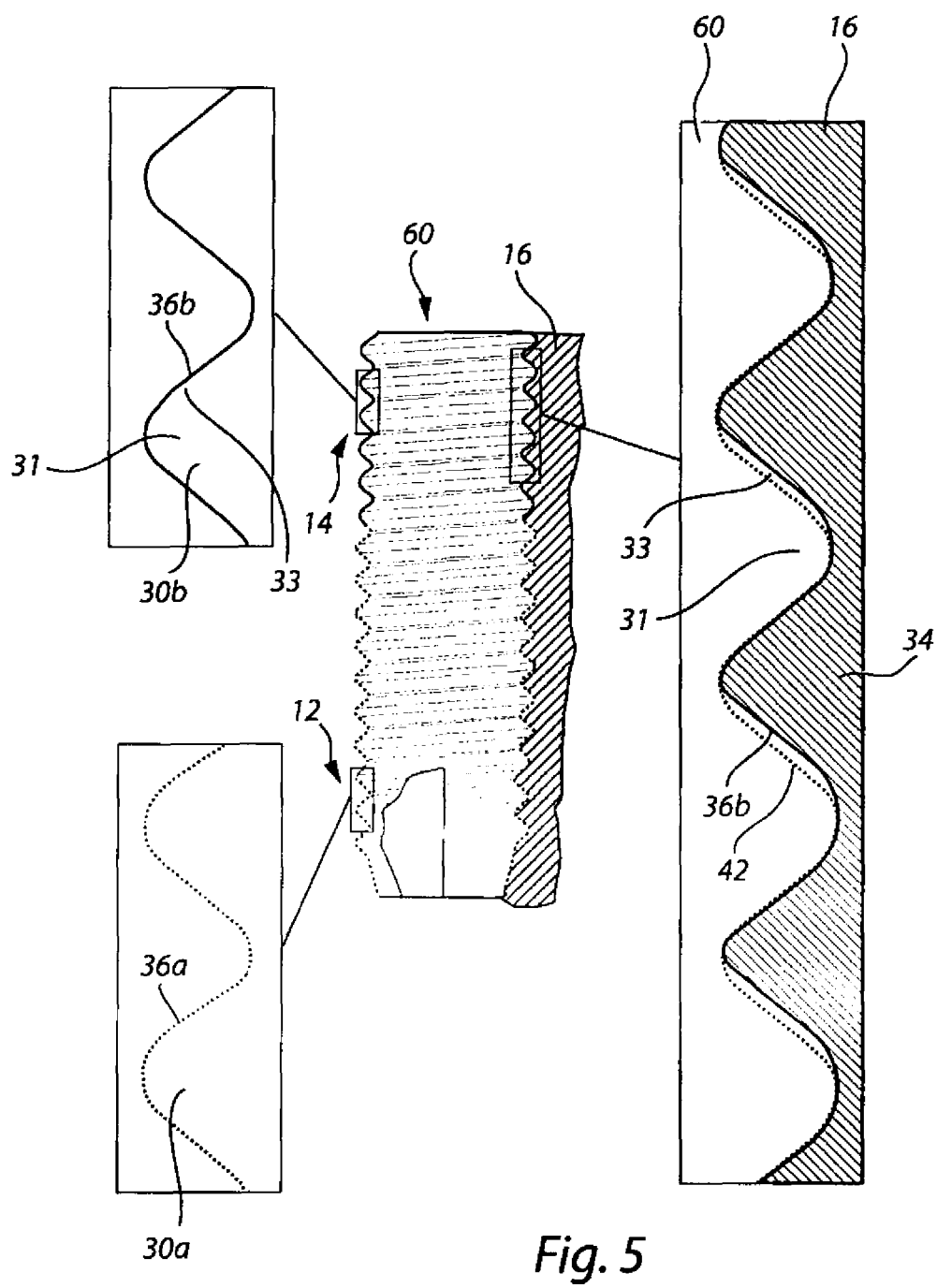
FIG. 5 is a side view illustrating schematically a fixture according to at least yet another example embodiment of the invention.

FIG. 5 is a side view illustrating schematically a fixture 60 according to at least yet another example embodiment of the invention. Contrary to the fixture 50 illustrated in FIG. 4, in FIG. 5 only the coronal flanks 36*b* of the thread peaks 30*b* in the trailing portion 14 have been displaced in relation to the coronal flanks 36*a* of the thread peaks 30*a* in the leading portion 12, and thus in relation to the mating flank 42 of the bone plug 34 (N.B on the apical side of the bone plug). The displacement of the coronal flanks 36*b* is obtained by overdimensioning the respective thread peaks 30*b* of the trailing portion 14. More specifically, a second area 33 has been added coronally to a first area 31 of the thread peak 30*b*, said first area 31 having the same contour as the thread peak 30*a* of the leading portion 12. The thread peak 30*b* in the trailing portion 14 obtains a change of top radius approximately at the centre of the thread top. In the enlarged detailed view on the right side of FIG. 5 the mating flank 42 is illustrated with a dotted line representing the geometry before the trailing portion 14 has mated and condensed the bone tissue 16. Thus, in the equation presented in connection with the discussion of FIG. 3, the value of a would be zero in FIG. 5.

Figure 6:
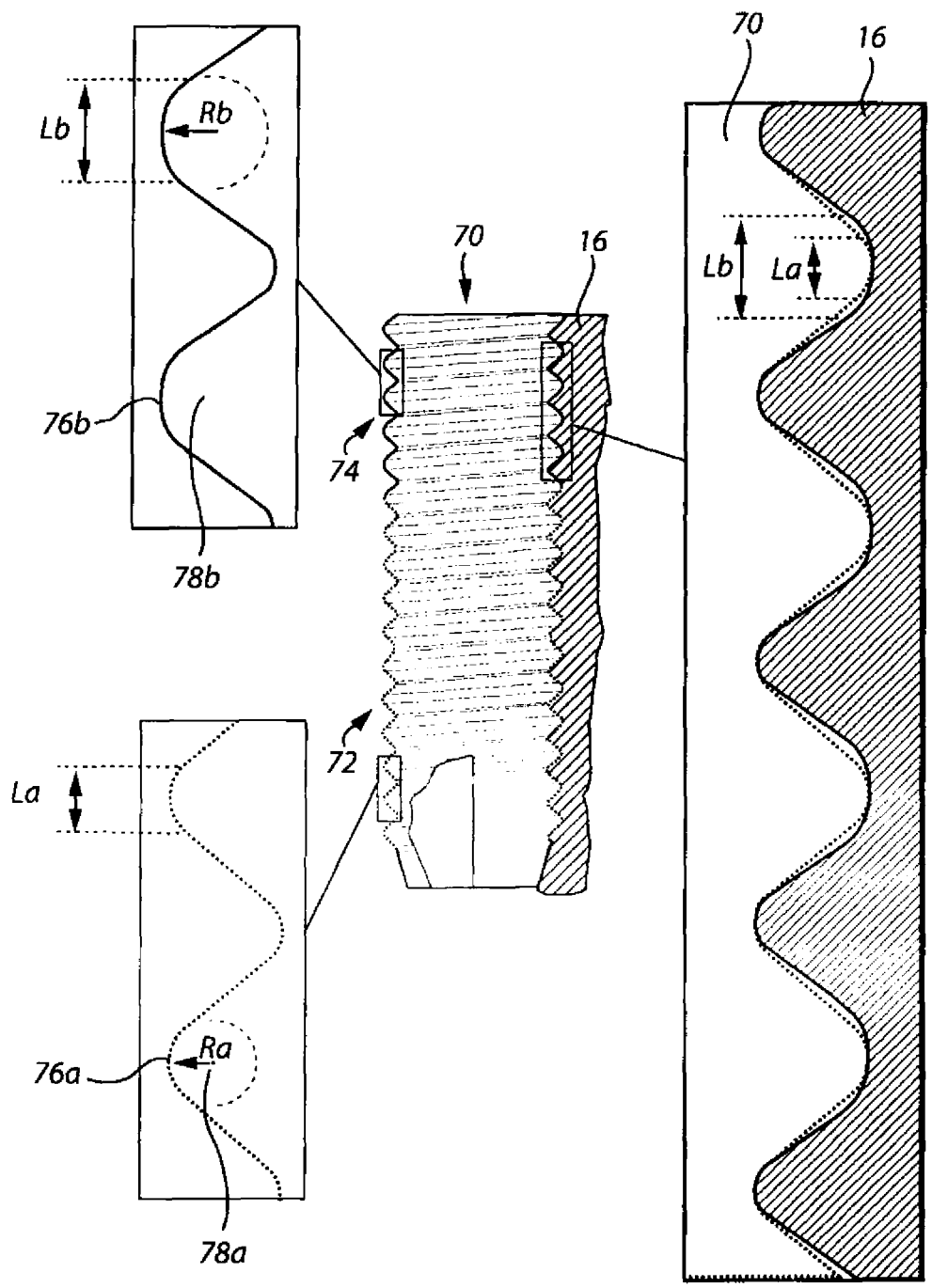
FIG. 6 is a side view illustrating schematically a fixture according to at least a further example embodiment of the invention.

FIG. 6 is a side view illustrating schematically a fixture 70 according to at least a further example embodiment of the invention. In this fixture 70 the thread tops 76*a*, 76*b* are different when comparing the threads in the trailing portion 74 with those in the leading portion 72. The axial extension Lb of a thread top 76*b* in the trailing portion 14 is larger than the axial extension La of a thread top 76*a* of the cutting edge in the leading portion 72. A top radius Rb of a thread peak 78*b* in the trailing portion 74 is larger than a top radius Ra of a thread peak 78*a* of the cutting edge in the leading portion 72.

Figure 7:
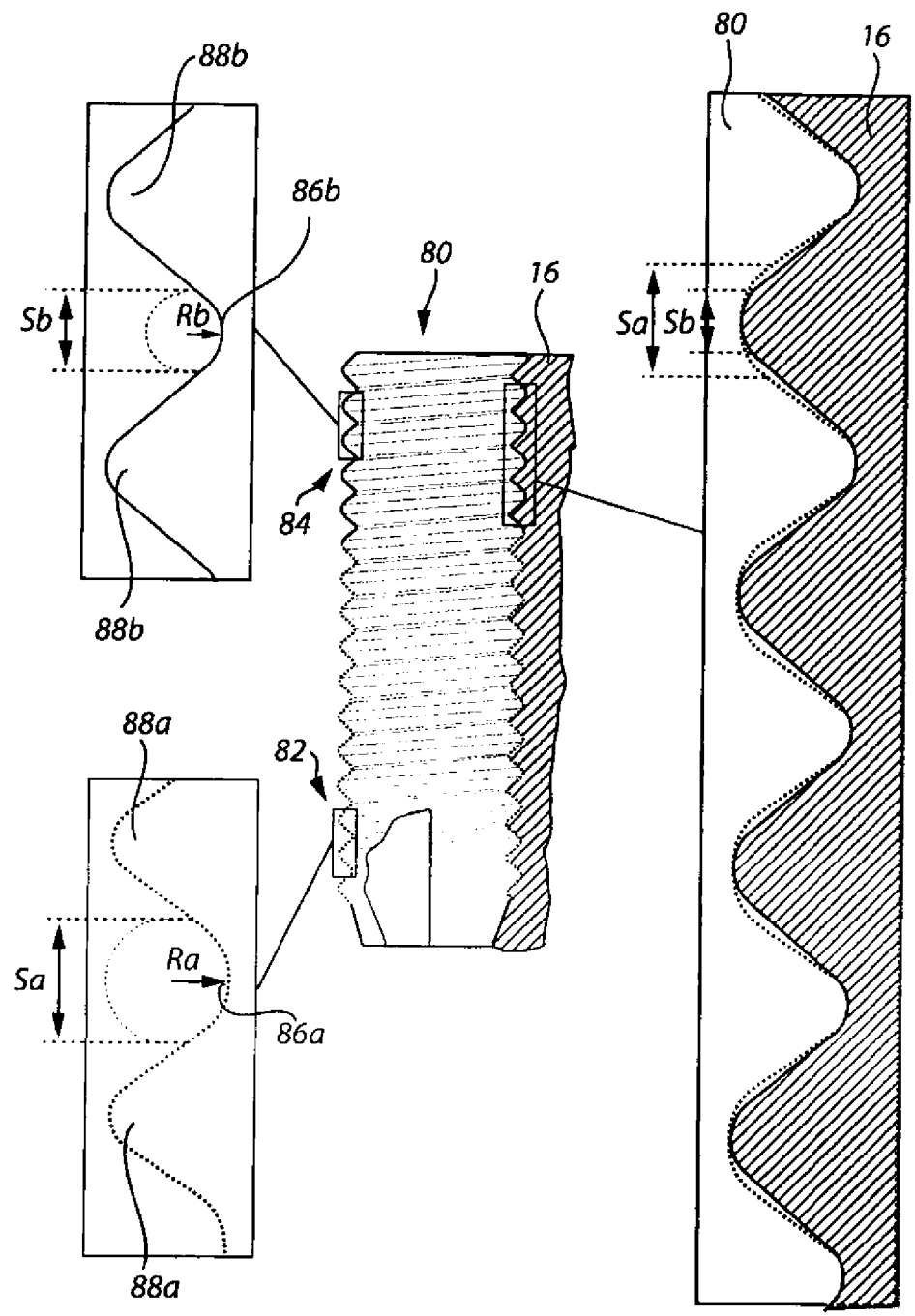
FIG. 7 is a side view illustrating schematically a fixture according to at least a still further example embodiment of the invention.

FIG. 7 is a side view illustrating schematically a fixture 80 according to at least a still further example embodiment of the invention. In this fixture 80 the thread bottoms 86*a*, 86*b* are different when comparing the threads in the trailing portion 84 with those in the leading portion 82. The axial extension Sb of a thread bottom 86*b* between two consecutive thread peaks 88*b* in the trailing portion 84 is smaller than the axial extension Sa of a thread bottom 86*a* between two consecutive thread peaks 88*a* of said cutting edge in the leading portion 82. A bottom radius Rb between two consecutive thread peaks 88*b* in the trailing portion 84 is smaller than a bottom radius Ra between two consecutive thread peaks 88*a* of said cutting edge in the leading portion 82.

Figure 8:
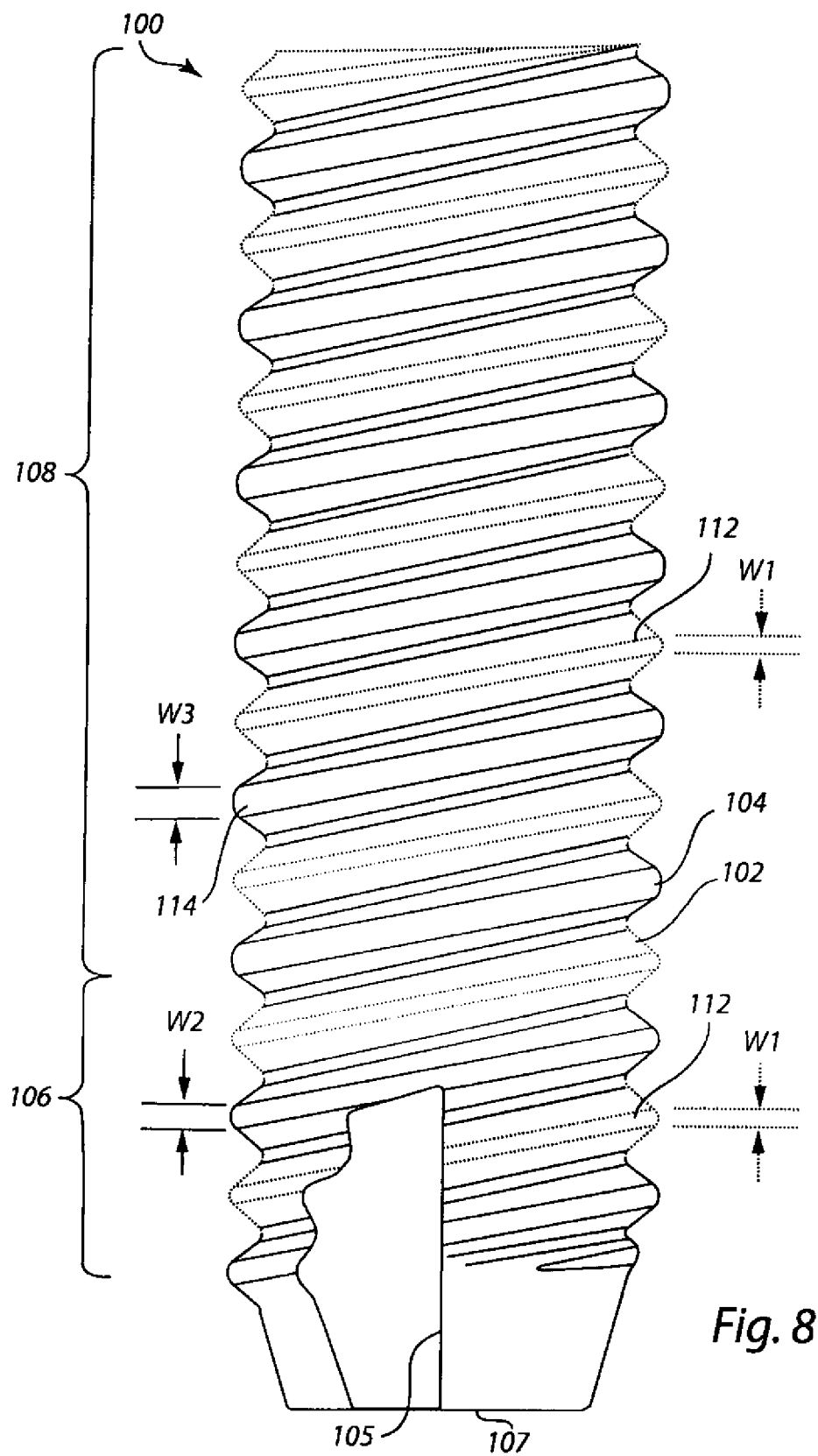
FIG. 8 is a side view illustrating schematically a fixture having a double thread spiral according to at least one example embodiment of the invention.

FIG. 8 is a side view illustrating schematically a fixture 100 having a double thread spiral according to at least one example embodiment of the invention. Thus, the fixture 100 is provided with a first thread spiral 102 (illustrated with dotted lines) and a second thread spiral 104 (illustrated with full lines). A cutting edge 105 extends from the apical end 107 over a portion of the implant which includes both spirals 102, 104. Thus, two parallel spirals will be created in the bone tissue, which will have the complementary geometry to the first and second thread spirals 102, 104, respectively.

The profile of the first thread spiral 102 remains the same along the length of the fixture 100. Thus, the axial extension, i.e. the width, W1 of the thread peaks 112 of the first spiral 102 remain the same in both the leading portion 106 and the trailing portion 108 of the fixture 100. The profile of the second thread spiral 104 changes at the trailing portion 108. More specifically, in the trailing portion 108, the thread peaks 114 of the second spiral 104 have a larger axial extension W3 than their extension W2 in the leading portion 106. Thus, with this configuration, every other thread peak 114 in the trailing portion 108, i.e. the peaks 114 of the second spiral 104, will provide a static strain to the bone.

Conversely, the interposed peaks 112, i.e. the peaks of the first spiral 102 will not provide a static strain to the bone.

Figure 9:
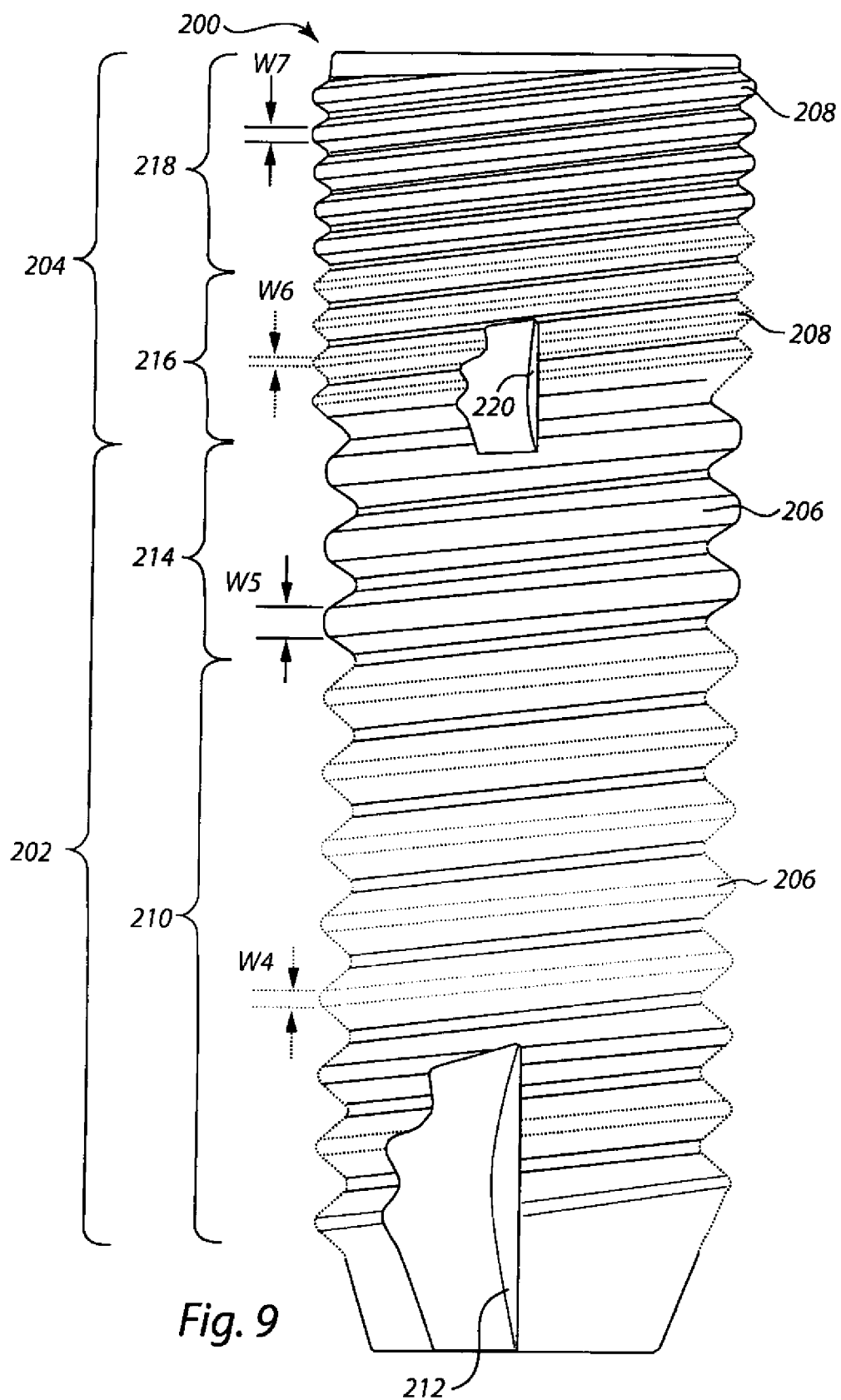
FIG. 9 is a side view illustrating schematically a fixture providing two strain zones to the bone, in accordance with at least one example embodiment of the invention.

FIG. 9 is a side view illustrating schematically a fixture 200 providing two strain-creating zones 202, 204 to the bone, in accordance with at least one example embodiment of the invention. Thus, the fixture 200 has an apical strain-creating zone 202 and a coronal strain-creating zone 204. The apical strain-creating zone 202 is provided with macro-threads 206 in the form of a single thread spiral, while the coronal strain-creating zone 204 is provided with micro-threads 208 in the form of a double thread spiral. The lead of the micro-threads 208 and the macro-threads 206 is the same, however, the pitch of the micro-threads 208 is half of the pitch of the macro-threads 206.

Starting with the apical strain-creating zone 202, it has a leading portion 210 provided with a cutting edge 212. The threading (macro-threads 206) at the leading portion 210 is illustrated by the dotted line. Similarly to the previously discussed embodiments, the cutting edge 212 will create a female bone thread in the bone which has a complementary profile to that of the threading in the leading portion 210 of the apical strain-creating zone 202. As the trailing portion 214 (full line) enters the female bone thread, it will because of its greater peak widths W5 (compared to the smaller peak widths W4 in the leading portion 210) provide an axial pressure to the bone, thereby condensing the bone and achieving a static strain to the bone. The apical strain-creating zone 202 is intended to be in contact with cancellous bone tissue. Therefore, the width W5 of the thread peaks in the trailing portion 214 and the width W4 in the leading portion 210, and the inter-peak spacings, are suitably dimensioned in such way that a strain of e.g. 0.06-0.3, suitably in the range of 0.06-0.1, is provided to the bone.

The coronal strain-creating zone 204 presents a portion of the fixture which has a larger diameter than the fixture diameter at the apical strain-creating zone 202. The bore hole in the bone should therefore have a wider portion, i.e. a portion having a larger diameter, to accommodate the coronal strain-creating zone 204. This wider bore hole portion will be at the cortical bone tissue, which is where the coronal strain-creating zone 204 is intended to be placed. By making a wider bore hole portion at the cortical portion of the bore hole, the high pressure which would have been caused by the macrothreads 206 as they enter the cortical portion of the bore hole is avoided. While the cancellous bone tissue can take a high static strain, it may be too much for the brittle cortical portion (of course, depending on the dimensions chosen for the specific fixture).

The coronal strain-creating zone 204 is also provided with a leading portion 216 (dotted lines) and a trailing portion 218 (full lines). The leading portion 216 has a cutting edge 220 which will cut a double spiral into the cortical bone tissue. In the coronal strain-creating zone 204, the peaks of the threading in the trailing portion 218 has a larger axial extension W7 than the axial extension W6 of the peaks of the cutting edge 220 in the leading portion 216, the comparison being made at the same distance from the major and or minor diameter of the fixture 200 at the coronal strain-creating zone 204. Thus, the trailing portion 218 will provide a pressure to the cortical bone, creating a strain, which may suitably be in the range of 0.01-0.1, such as in the range of 0.01-0.03, suitably in the range of 0.01-0.02.

Figure 10:
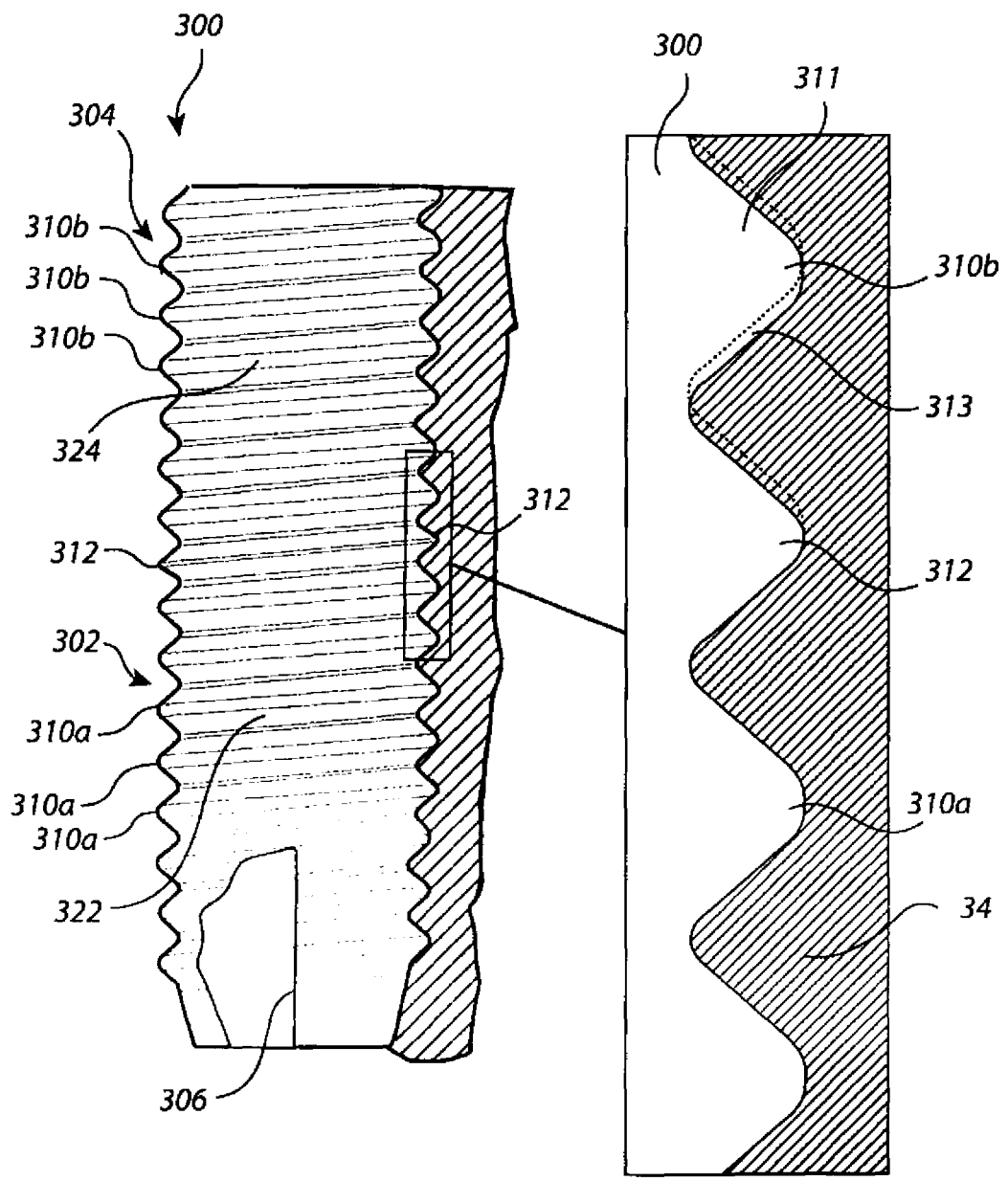
FIG. 10 is a side view illustrating schematically a fixture according to at least another example embodiment of the invention.

FIG. 10 is a side view illustrating schematically a fixture 300 according to at least another example embodiment of the invention. The cross-sections/profiles of the thread peaks 310*a*, 310*b* are substantially the same along the axial length of the fixture. There is, however, an exception. A differently dimensioned thread peak 312 forms a boundary between a leading portion 302 having at least one cutting edge 306 and a condensing trailing portion 304 lacking cutting edges. The differently dimensioned thread peak 312 is narrower and more compressed relative to the other thread peaks 310a, 310b. Thus, the axial extension of the differently dimensioned thread peak 312 is somewhat shorter than for the other thread peaks 310a, 310b. This has the effect that the thread peaks 310b in the trailing portion 304, i.e. the thread peaks coronally of the differently dimensioned thread peak 312, are located slightly more apically than what would have been the case if all thread peaks would have been identical. This is illustrated in the enlarged detailed view in FIG. 10. The dotted line shows how the thread peaks in the trailing portion 304 would have been located if there would not have been a differently dimensioned thread peak 312. The full line shows the effect of the differently dimensioned thread peak 312. As can be seen from the figure, the narrower differently dimensioned thread peak 312 results in an axial (apical) displacement. The result of the apical displacement is similar to that of the example embodiment shown in FIG. 4. However, in the example embodiment shown in FIG. 4 the overdimensioning second areas 33 deformed and displaced the apical flanks 38b of the thread peaks 30b of the trailing portion 14 relative to the apical flanks 38a of the thread peaks 30a of the leading portion 12. In FIG. 10, the thread peaks 310a in the leading portion 302 cutting the female thread in the bone 34 and the thread peaks 310b in the trailing portion 304 condensing the bone have the same dimensions, however, the thread peaks 310b of the trailing portion 304 are displaced relative to the formed female thread, because of the local narrowing of the differently dimensioned thread peak 312.

In other words, a first area 311 of a thread peak 310b of the trailing portion 304 is axially aligned with an imaginary continuation into the trailing portion 304 of the (largest) thread peak 310a of the cutting edge 306 following the lead of the thread 322 in the leading portion 302, and a second area 313 of said thread peak 310b of the trailing portion 304 is axially displaced by comparison with an imaginary continuation into the trailing portion 304 of the (largest) thread peak 310a of the cutting edge 306 following the lead of the thread 322 in the leading portion 302. The (largest) thread peak 310a of said cutting edge 306 of the leading portion 302 forms part of the thread 322 having a lead defining a first helical path in the leading portion 302, wherein said thread peak 310b of the trailing portion 304 forms part of a thread 324 having a lead defining a second helical path which is partly axially displaced relative to an imaginary extension into the trailing portion 304 of the first helical path.

It should be understood that although the displacement of the thread peaks 310b of the trailing portion 304 has been achieved by locally narrowing a thread peak 312, such as along one revolution around the fixture 300, an alternative would be to design the thread with several revolutions of narrowing/narrower dimensions, thus resulting in several differently dimensioned thread peaks along the axial extension of the fixture.

As an alternative to having one or more differently dimensioned thread peaks, is to have one or more differently dimensioned thread bottoms between consecutive thread peaks. An example of such an alternative is illustrated in FIG. 11.

Figure 11:
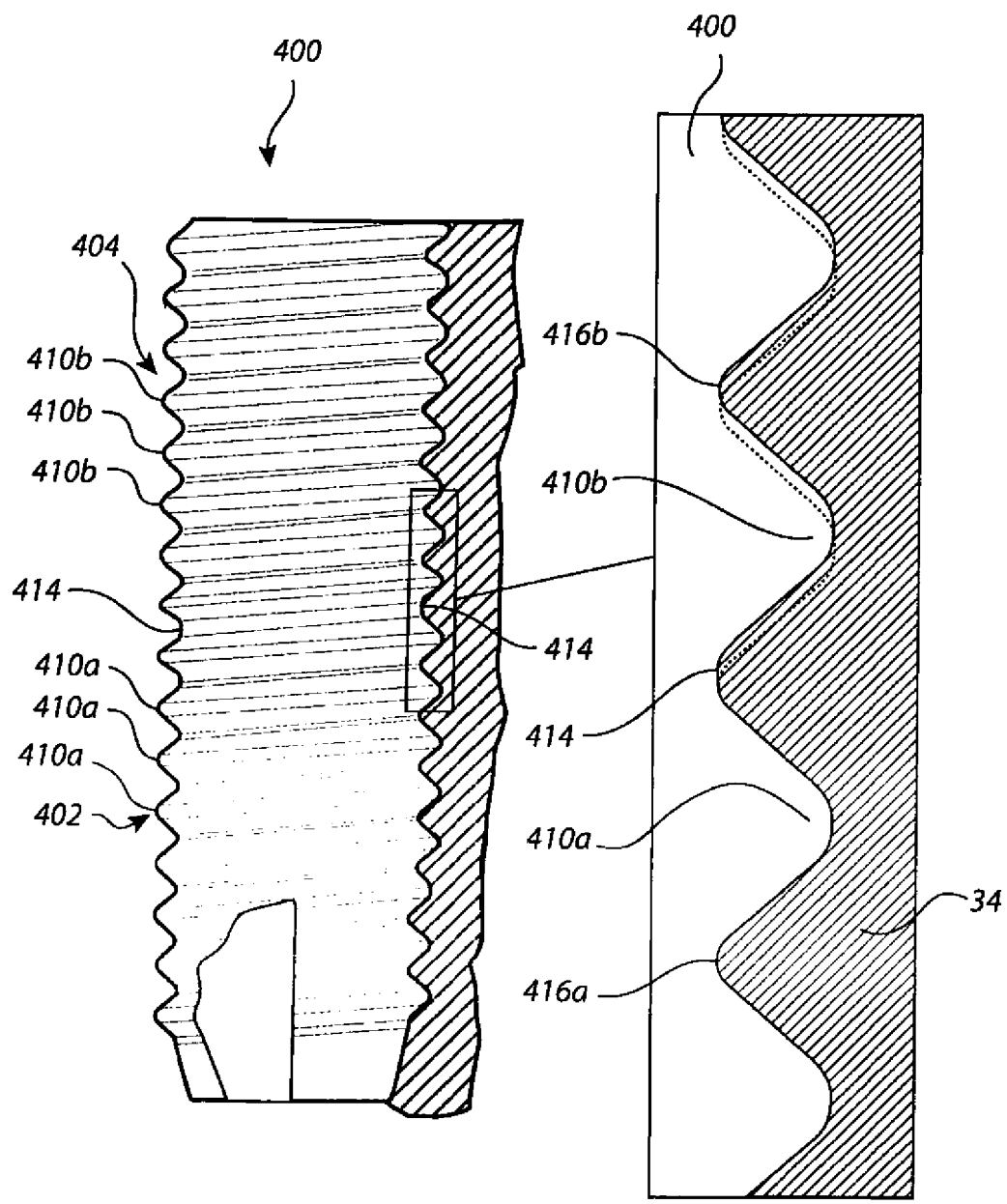
FIG. 11 is a side view illustrating schematically a fixture according to at least yet another example embodiment of the invention.

FIG. 11 is a side view illustrating schematically a fixture 400 according to a least yet another example embodiment of the invention. In FIG. 11 a thread bottom 414 between two axially consecutive thread peaks 410a, 410b is differently dimensioned compared to the other thread bottoms 416a, 416b. The differently dimensioned thread bottom 414 has a longer axial extension than the other thread bottoms 416a, 416b, and it defines the boundary between the leading portion 402 and the trailing portion 404. The longer axial extension of the differently dimensioned thread bottom 414 has the effect that the coronally following thread peaks 410b, i.e. the thread peaks of the trailing portion 404, are axially displaced compared to what would have been the case if there would not have been a differently dimensioned thread bottom 414. The dotted line shows how the thread peaks in the trailing portion would have been located if there would not have been a differently dimensioned thread bottom 414. The full line shows the effect of the differently dimensioned thread bottom 414. As can be seen from the figure, the wider differently dimensioned thread bottom 414 results in an axial (coronal) displacement of the thread peaks 410b in the trailing portion 404. The result of the coronal displacement is similar to that of the example embodiment shown in FIG. 5. However, in the example embodiment shown in FIG. 5 the overdimensioning second areas 33 deformed and displaced the coronal flanks 36b of the thread peaks 30b of the trailing portion 14 relative to the coronal flanks 36a of the thread peaks 30a of the leading portion 12. In FIG. 11, the thread peaks 410a in the leading portion 402 cutting the female thread in the bone 34 and the thread peaks 410b in the trailing portion 404 condensing the bone have the same dimensions, however, the thread peaks 410b of the trailing portion 404 are displaced relative to the formed female thread, because of the local widening of the differently dimensioned thread bottom 414.

With regard to the example embodiments of FIG. 10 and FIG. 11, it should be noted that although the thread peaks in the leading portion and trailing portion have been illustrated as having the same cross-section/profile, in alternative embodiments they may have different profiles. Thus, one or more thread peaks in the trailing portion may have smaller dimensions than the thread peaks in the leading portion, e.g. shorter axial extension, and still being displaced in order to condense the bone. Likewise, one or more thread peaks in the trailing portion may have larger dimensions compared to the thread peaks in the leading portion, e.g. longer axial extension. The latter alternative would enable both coronally directed and apically directed pressure to the bone at the trailing portion rather than just apically directed (FIG. 10) or coronally directed (FIG. 11) pressure at the trailing portion (and counteracting pressure in the leading portion). In other words, the thread peak(s) of the trailing portion may have both of the following features:
  i) deformed relative to the (largest) thread peak(s) of a cutting edge in the leading portion,
  ii) located along a second helix (defined by the lead of the thread in the trailing portion) which is axially displaced relative to a first helix (defined by the lead of the thread in the leading portion).

Figure 12:
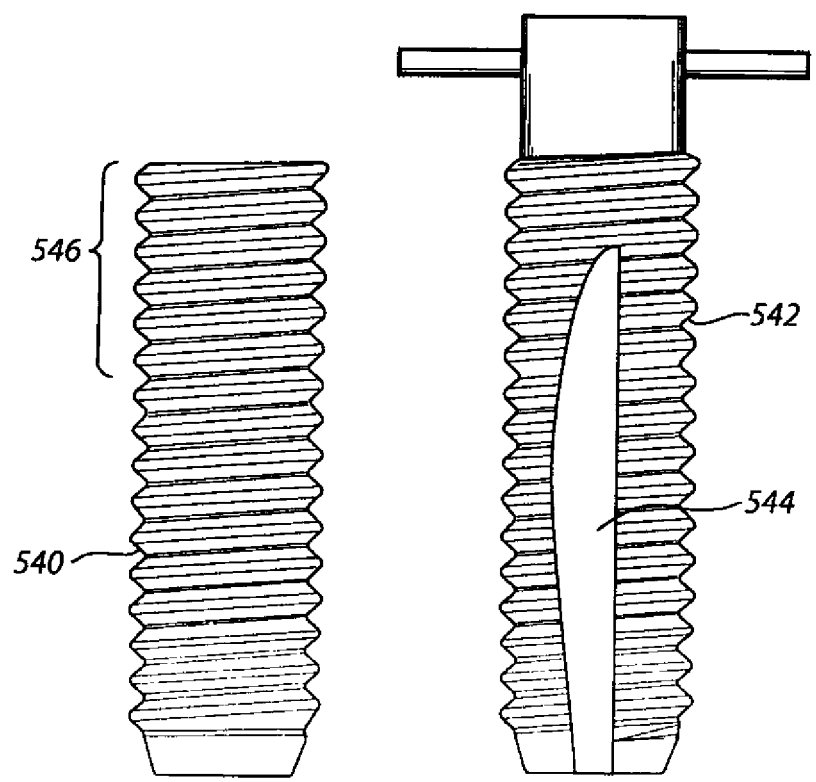
FIG. 12 illustrates a fixture arrangement or fixture set, comprising a fixture and a separate tapper, in accordance with at least one example embodiment of the invention.

FIG. 12 illustrates a fixture arrangement or fixture set, comprising a fixture 540 and a separate thread maker or tapper 542, in accordance with at least one example embodiment of the invention. The fixture 540 is herein illustrated as the fixture in FIG. 3, however, without any cutting edges. Instead the separate tapper 542, having a shape and threads with the same lead and pitch as the threads of the fixture 540, is provided with one or more cutting edges 544. Thus, in use, after a bore hole has been made in the bone, the tapper 542 is screwed into the bone, whereby the cutting edges 544 cut into the bone to make female bone threads. When the tapper 542 has been unscrewed from the bore hole the fixture 540 may be rotated into the bore hole as the female bone threads provide a path for the fixture threads to follow. A condensation portion 546 of the fixture has overdimensioned thread peaks in the coronal and axial directions compared to the geometry of the created female thread. Thus, a strain will be provided by this condensation portion 546, similarly to the strain provided by the trailing portion 14 in FIG. 3. Although the fixture in FIG. 3 has been used as the basis for the example in FIG. 12, it should be noted that the same principle applies also to other fixtures. For instance, the fixtures which have been illustrated in the other figures could be modified by omitting the cutting features, and instead use a separate tapper having cutting features to provide a matching female bone thread. Furthermore, the extension of the condensation portion 546 does not have to be limited to a coronal section of the fixture, it could extend along the entire fixture length, depending on what portions of the bone should be condensed/provided with strain. A long condensation portion 546 may, for instance, be advantageous if the patient has substantially only cancellous bone. Another example would be to use a tapper 542 according to FIG. 12 to make the female bone threads and then insert a fixture like the ones illustrated in FIG. 10 or FIG. 11 (the cutting-edges of the fixtures may be omitted).

It should be noted that although only a number of example embodiments have been illustrated in the drawing figures, other embodiments are conceivable within the scope of the claims, for instance as exemplified under the heading "Summary of the invention". Furthermore, features in one embodiment may, if appropriate, be combined with features in other embodiments.

The invention claimed is:

1. A fixture for insertion into a. bore hole arranged in bone tissue, the fixture having a geometrical central axis and comprising:
   a leading portion provided with at least one cutting edge formed by a gap in the continuity of a thread of the leading portion, the at least one cutting edge extending from an apical end of the fixture into part of the leading portion, said at least one cutting edge configured to create a female thread in the bone tissue;
   a trailing portion following the leading portion in the created female thread;
   thread tops and thread bottoms that are rounded and are provided alternatingly in the axial direction of the fixture in both the leading portion and the trailing portion, each thread top forming part of a thread peak arranged between two consecutive thread bottoms;
   wherein said leading and trailing portions each comprise a respective outer surface being threaded for engagement with bone tissue,
   wherein a largest thread peak of said at least one cutting edge of the leading portion forms part of the thread of the leading portion having a lead, wherein compared with an imaginary continuation into the trailing portion of said largest thread peak following said lead:
   a first area of a thread peak of the trailing portion is axially aligned with said imaginary continuation, and
   a second area of said thread peak of the trailing portion is axially displaced compared with said imaginary continuation, thereby providing a strain to the bone, without augmenting the stress that is naturally present in the bone around said thread peak, when said thread peak of the trailing portion engages with the created female thread created by the at least one cutting edge, the comparison of the thread peaks being made at a same first distance from a respective thread bottom measured perpendicularly to said central axis, and/or at a same second distance from a respective thread top measured perpendicularly to said central axis,
   wherein a top radius of a thread peak in the trailing portion is larger than a top radius of said largest thread peak of said at least one cutting edge in the leading portion.

2. The fixture according to claim 1, wherein said at least one cutting edge spans a plurality of thread peaks in the leading portion and wherein said largest thread peak of said at least one cutting edge that spans the plurality of thread peaks in the leading portion forms part of the thread of the leading portion having the lead which lead defines a first helical path in the leading portion, wherein said thread peak of the trailing portion forms part of another thread having another lead defining a second helical path in the trailing portion which is partly axially displaced relative to an imaginary extension of the first helical path into the trailing portion.

3. The fixture according to claim 1, wherein, compared to the geometry of the largest thread peak of said at least one cutting edge of the leading portion, a thread peak of the trailing portion is overdimensioned in at least one of the coronal and apical directions of the fixture so that said strain is provided to the bone when said overdimensioned thread peak engages with the created female thread, the comparison being made at a same first distance from a respective thread bottom measured perpendicularly to said central axis, and/or at a same second distance from a respective thread top measured perpendicularly to said central axis.

4. The fixture according to claim 1, wherein the axial extension of a thread bottom between two consecutive thread peaks in the trailing portion is shorter than the axial extension of a thread bottom between two consecutive thread peaks of said at least one cutting edge in the leading portion.

5. The fixture according to claim 1, wherein a bottom radius between two consecutive thread peaks in the trailing portion is smaller than a bottom radius between two consecutive thread peaks of said at least one cutting edge in the leading portion.

6. The fixture according to claim 1, wherein in the trailing portion and the leading portion each thread top interconnects a coronal and an apical flank, wherein at least one of a coronal and an apical flank of a thread peak in the trailing portion is axially displaced relative to a respective mating flank of the female thread cut in the bone tissue by the leading portion, wherein at least one of said coronal and apical flanks of the thread peak in the trailing portion provides a strain to the bone tissue when the fixture is installed in the bone.

7. The fixture according to claim 1, wherein the trailing portion is included in a coronal fixture portion adapted to engage with cortical bone tissue, wherein the displacement of said second area of a thread peak of the trailing portion compared to said imaginary continuation into the trailing portion of said largest thread peak of said at least one cutting edge following said lead, is such that the strain provided to the bone is in the range of 0.01-0.3, or in the range of 0.01-0.1, or in the range of 0.01-0.03, or in the range of 0.01-0.02.

8. The fixture according to claim 1, wherein the trailing portion is included in an intermediate fixture portion adapted to engage with cancellous bone tissue, wherein the displacement of said second area of a thread peak of the trailing portion compared to said imaginary continuation into the trailing portion of said largest thread peak of said at least one cutting edge following said lead, is such that the strain provided to the bone is in the range of 0.01-0.3, or in the range of 0.06-0.3, or in the range of 0.06-0.1.

9. The fixture according to claim 1, wherein threads in the trailing portion are microthreads.

10. The fixture according to claim 1, wherein the trailing portion is cylindrical.

11. The fixture according to claim 1, wherein said fixture is a dental fixture for arrangement in a jawbone.

* * * * *